United States Patent
Cao

(10) Patent No.: US 9,262,836 B2
(45) Date of Patent: Feb. 16, 2016

(54) ALL-FOCUSED IMAGE GENERATION METHOD, DEVICE FOR SAME, AND RECORDING MEDIUM FOR SAME, AND OBJECT HEIGHT DATA ACQUISITION METHOD, DEVICE FOR SAME, AND RECORDING MEDIUM FOR SAME

(71) Applicant: ACUTELOGIC CORPORATION, Shinagawa-ku, Tokyo (JP)

(72) Inventor: Hui Cao, Tokyo (JP)

(73) Assignee: ACUTELOGIC CORPORATION, Tokyo (JP)

( * ) Notice: Subject to any disclaimer, the term of this patent is extended or adjusted under 35 U.S.C. 154(b) by 126 days.

(21) Appl. No.: 14/351,202

(22) PCT Filed: Oct. 11, 2012

(86) PCT No.: PCT/JP2012/076269
§ 371 (c)(1),
(2) Date: Apr. 11, 2014

(87) PCT Pub. No.: WO2013/054825
PCT Pub. Date: Apr. 18, 2013

(65) Prior Publication Data
US 2015/0332473 A1  Nov. 19, 2015

(30) Foreign Application Priority Data
Oct. 11, 2011 (JP) .................... 2011-224214

(51) Int. Cl.
*G06T 5/50* (2006.01)
*G06T 7/00* (2006.01)
(Continued)

(52) U.S. Cl.
CPC ............ *G06T 7/0095* (2013.01); *G06T 1/0007* (2013.01); *G06T 5/009* (2013.01);
(Continued)

(58) Field of Classification Search
None
See application file for complete search history.

(56) References Cited

U.S. PATENT DOCUMENTS 5,511,155 A * 4/1996 Yamaguchi ............. G06T 5/003
345/428

FOREIGN PATENT DOCUMENTS

EP  0629964 A1  12/1994
JP  H06-243250 A  9/1994
(Continued)

OTHER PUBLICATIONS

Shirai, Keiichiro, Kazufumi Nomura, and Masaaki Ikehara. "All-in-focus photo image creation by wavelet transforms." Electronics and Communications in Japan (Part III: Fundamental Electronic Science) 90.3 (2007): 57-66.*
(Continued)

*Primary Examiner* — Vikkram Bali
*Assistant Examiner* — Tracy Mangialaschi
(74) *Attorney, Agent, or Firm* — Mots Law, PLLC

(57) ABSTRACT

An all-focused image generation method comprises the steps (i) to (vi). The step (i) is a step of taking L images of an object at different focal positions. The step (ii) is a step of acquiring gray scale images of the object at the respective focal positions. The step (iii) is a step of performing multiresolution transform for the gray scale images. The step (iv) is a step of calculating focal position probability distribution regarding the focal positions, for each pixel position. The step (v) is a step of acquiring an optimal focal position for each of the pixel positions. The step (vi) is a step of generating an in-focus image by providing a pixel corresponding to the acquired pixel value to the pixel position. In the step (v), the optimal focal position is approximately calculated by belief propagation.

16 Claims, 11 Drawing Sheets

(51) Int. Cl.
*G06T 1/00* (2006.01)
*G06T 5/00* (2006.01)

(52) U.S. Cl.
CPC ............ *G06T 7/0069* (2013.01); *G06T 7/0085* (2013.01); *G06T 7/0097* (2013.01); *G06T 2207/10024* (2013.01); *G06T 2207/10056* (2013.01); *G06T 2207/10148* (2013.01); *G06T 2207/20048* (2013.01); *G06T 2207/20192* (2013.01); *G06T 2207/20201* (2013.01); *G06T 2207/20221* (2013.01)

(56) References Cited

FOREIGN PATENT DOCUMENTS

| | | | |
|---|---|---|---|
| JP | 2002-532761 A | 10/2002 | |
| JP | 2004-070139 A | 3/2004 | |
| JP | 2005-149227 A | 6/2005 | |
| JP | 2005-202907 A | 7/2005 | |
| JP | 2010-066156 A | 3/2010 | |
| JP | 2010-129077 A | 6/2010 | |
| JP | 2010-166247 A | 7/2010 | |
| JP | 2011-525009 A | 9/2011 | |
| WO | 00/36551 A1 | 6/2000 | |
| WO | 2009/145723 A1 | 12/2009 | |

OTHER PUBLICATIONS

Shirai et al. "All-in-Focus Photo Image Creation by Wavelet Transforms", The Institute of Electronics, Information and Communication Engineers academic journal A vol. J88-A, No. 10, pp. 1154-1162, 2005.

\* cited by examiner

CANDIDATES OF R1
    MULTIRESOLUTION EXPRESSIONS    IM4_1  IM4_2  IM4_6  IM4_9 ⋯
    WAVELET COEFFICIENTS    0.5    0.4    0.9    0.2 ⋯

CANDIDATES OF R2
    MULTIRESOLUTION EXPRESSIONS    IM4_7  IM4_8  IM4_11  IM4_13 ⋯
    WAVELET COEFFICIENTS    0.8    0.7    0.5    0.4 ⋯

CANDIDATES OF R3
    MULTIRESOLUTION EXPRESSIONS    IM4_9  IM4_10  IM4_12  IM4_20 ⋯
    WAVELET COEFFICIENTS    0.8    0.7    0.5    0.4 ⋯

INITIAL VALUE: $m_{i' \to j'}^{0 \; n-1} = m_{i \to j}^{T \; n}$

ALL-FOCUSED IMAGE GENERATION METHOD, DEVICE FOR SAME, AND RECORDING MEDIUM FOR SAME, AND OBJECT HEIGHT DATA ACQUISITION METHOD, DEVICE FOR SAME, AND RECORDING MEDIUM FOR SAME

TECHNICAL FIELD

The present invention relates to an all-focused image generation method, in particular to an all-focused image generation method based on images taken at plural focal positions, a device and a program for the method, and an object height data acquisition method and a device and a program for the method.

BACKGROUND ART

When an image of an object is taken through a lens, it has been known that regions other than a particular region are blurred in the taken image because a focused part and out-of-focus parts are in the same visual field. Such a phenomenon tends to occur in high-power lenses on account of shallow focus depth. For example, when an object such as a specimen is observed by a microscope having a high-power objective lens, there may be a case where, on account of irregularities on the specimen, a region in the image is in focus whereas another region is out of focus, and hence the viewer cannot grasp the whole picture of the object through the image. To solve this problem, the object is imaged at different focal positions by moving the lens or the object in the optical axis direction, and an all-focused image in which all regions in the image are in focus is obtained from the plural images taken at the different focal positions.

For this process, different imaging technologies have been proposed. According to Patent Literature 1, images taken at different focal positions are each wavelet transformed, and in each pixel in multiresolution expression after the transform, an wavelet value at which the amplitude between images with different focal positions is at the maximum is sampled. Then a single synthetic image in which the sampled wavelet value is provided in each pixel is generated, and the synthetic image is subjected to wavelet inverse transform. An all-focused image is formed in this way.

According to Patent Literature 2, images taken at different focal positions are wavelet transformed in the same manner as in Patent Literature 1. Thereafter, the wavelet coefficients of pixels in the vicinity of a target pixel are added up and the resultant values of images at different focal positions are compared with one another, and one or more pixel is sampled from the image having the largest added-up value. An all-focused image is generated in this way. In Patent Literature 2, for each subband after the wavelet transform, a morphological operation is conducted for a five-by-five matrix of pixels around each pixel which is the target of the operation. This achieves effects such as the reduction of noise, and an all-focused image having emphasized borders between high-frequency and low-frequency regions is generated.

According to Patent Literature 3, each of images taken at different focal positions is divided into three regions, i.e., an edge region, a vicinity of the edge region, and a region which is neither the edge region nor the vicinity of the edge region, and a focusing position of each region is obtained by a different method. To begin with, the images at different focal positions are compared with one another in an amount of change between the brightness of a target pixel and the brightness of pixels surrounding the target pixel, and the maximum amount is obtained. Thereafter, when the obtained maximum amount is larger than a threshold amount of change, that target pixel is set as the edge region and the position of the image having the maximum amount is set as the focusing position. In the meanwhile, in the pixels in the vicinity of the edge region, the inflexion point of the brightness in the focal depth direction is set as the focusing position. In the pixels which are neither the edge region nor the vicinity of the edge region, an in-focus pixel is calculated by the interpolation from the pixels which are obtained as the pixels at the focusing positions in the edge region and in the vicinity of the edge region.

CITATION LIST

Patent Literatures

[Patent Literature 1] Japanese Unexamined Patent Publication No. 6-243250
[Patent Literature 2] Japanese Unexamined Patent Publication No. 2010-129077
[Patent Literature 3] Japanese Unexamined Patent Publication No. 2010-166247

SUMMARY OF INVENTION

Technical Problem

As described above, all of Patent Literatures 1 to 3 teach that the pixels at the focusing positions are sampled by utilizing a wavelet value or by sampling a pixel having a large amount of change in brightness. However, when, for example, a problem such as image noise, saturation, and blur occurs in image taking, the taken image may be disadvantageously arranged such that the contrast value is small in an in-focus region whereas the contrast value is large in an out-of-focus region. When such disadvantage occurs, an out-of-focus position may be regarded as a focusing position, when the technology of Patent Literature 1 or Patent Literature 2 is used and the focusing position is obtained by utilizing a wavelet value or by comparing the amounts of change in brightness.

Patent Literature 3 tries to resolve the disadvantage above by dividing an image into three regions and obtaining a focal position of each region by a different method. In Patent Literature 3, however, in a part which is distant from the edge region and the vicinity thereof, an in-focus pixel is obtained by the interpolation based on the pixels in the edge region and in the vicinity of the edge region. For this reason, when a pixel which is the target of interpolation is significantly distant from the edge region and the vicinity thereof or is at a position which is different from these regions in the depth direction, an error in the interpolation tends to be large. For this reason, even if an image in which a local region composed of an edge region and in the vicinity thereof is properly in focus is obtained, the image may not be properly in focus across global areas.

The first object of the present invention is to provide an all-focused image generation method for generating, from a plurality of images taken at different focal positions, an image in which different pixel positions are in focus, by which method an image which is properly in focus across global areas is generated even if problems such as image noise, saturation, and blur occur in image taking, and to provide an all-focused image generator and an all-focused image generation program supporting the method.

Sampling in-focus images at respective pixel positions from images taken at different focal positions is equivalent to the acquisition of height information calculated from the focal position for each pixel position. In this connection, the above-described problems caused by image noise or the like also occur when the height information of an object is acquired for each pixel position in the same manner.

The second object of the present invention is to provide an object height data acquisition method of acquiring, for each pixel position, the height information of an object based on plural images taken at different focal positions, by which method the height information of the object is properly obtained across global areas of the image even if problems such as image noise, saturation, and blur occur in image taking, and to provide an object height information acquisition device and an object height information acquisition program supporting the method.

Solution to Problem

According to the first aspect for achieving the first object, an all-focused image generation method includes the steps of: (i) taking L images of an object at different focal positions, L indicating a natural number not smaller than two; (ii) acquiring gray scale images of the object at the respective focal positions based on the images taken in the step (i); (iii) by performing multiresolution transform for the gray scale images obtained in the step (ii), generating, for each of the focal positions, a resolution-decomposed image in which a gray scale image is decomposed to components of different frequency bands; (iv) based on the resolution-decomposed image generated in the step (iii), calculating focal position probability distribution which is probability distribution regarding the focal positions, for each pixel position of the gray scale image; (v) based on the focal position probability distribution calculated in the step (iv), acquiring an optimal focal position for each of the pixel positions; and (vi) based on the optimal focal position acquired in the step (v), acquiring, for each of the pixel positions, a pixel value corresponding to the optimal focal position from the images at the focal positions taken in the step (i), and generating an in-focus image by providing a pixel corresponding to the acquired pixel value to the pixel position, in the step (v), provided that i and j are subscripts indicating the pixel position, $x_i$ and $x_j$ are variables each of which is a natural number not larger than L, and $x_i$ is allocated to a plurality of pixel positions i as the focal positions, when a function, which is calculated by adding up a cost function $D_i(x_i)$ of each of the pixel positions i based on the focal position probability distribution calculated in the step (iv) and a penalty function $V(x_i, x_j)$ which increases as an absolute value of a difference between $x_i$ and $x_j$ increases in regard to the pixel positions i and neighboring i and j, is an evaluation function E, a combination of $x_i$ in regard to the pixel positions i, with which E is minimized, is approximately calculated by belief propagation as the optimal focal position.

An all-focused image generator of the first aspect for generating an in-focus image of an object from L object images taken at different focal positions, L indicating a natural number not smaller than two, includes: a multiresolution transform image generator configured to, by performing multiresolution transform for gray scale images at the respective focal positions of the object, generate, for each of the focal positions, a resolution-decomposed image in which a gray scale image is decomposed to components of different frequency bands; a focal position probability calculator configured to, based on the resolution-decomposed images generated by the multiresolution transform image generator, calculate focal position probability distribution which is probability distribution regarding the focal positions, for each pixel position of the gray scale image; an optimal focal position acquisition part configured to, based on the focal position probability distribution calculated by the focal position probability calculator, acquiring an optimal focal position for each of the pixel positions; an in-focus image synthesizer configured to, based on the optimal focal position acquired by the optimal focal position acquisition part, acquire, for each of the pixel positions, a pixel value corresponding to the optimal focal position from the image at each of the focal positions, and generate an in-focus image by providing a pixel corresponding to the acquired pixel value to the pixel position, provided that i and j are subscripts indicating the pixel position and $x_i$, $x_j$ are variables each of which is a natural number not larger than L, and $x_i$ is allocated to a plurality of pixel positions i as the focal positions, when a function, which is calculated by adding up a cost function $D_i(x_i)$ of each of the pixel positions i based on the focal position probability distribution calculated by the focal position probability calculator and a penalty function $V(x_i, x_j)$ which increases as an absolute value of a difference between $x_i$ and $x_j$ increases in regard to the pixel positions i and neighboring i and j, is an evaluation function E, the optimal focal position acquisition part approximately calculates a combination of $x_i$ in regard to the pixel positions i by belief propagation so that E is minimized, as the optical focal position.

According to the first aspect, a non-transitory computer-readable recording medium recording thereon a computer program, which causes a computer to generate an in-focus image of an object from L object images taken at different focal positions, L indicating a natural number not smaller than two, causes the computer to execute the steps of: (i) by performing multiresolution transform for gray scale images at the focal positions of the object, generating, for each of the focal positions, a resolution-decomposed image in which a gray scale image is decomposed to components of different frequency bands; (ii) based on the resolution-decomposed image generated in the step (i), calculating focal position probability distribution which is probability distribution regarding the focal positions, for each pixel position of the gray scale image; (iii) based on the focal position probability distribution calculated in the step (ii), acquiring an optimal focal position for each of the pixel positions; and (iv) based on the optimal focal position acquired in the step (iii), acquiring, for each of the pixel positions, a pixel value corresponding to the optimal focal position from the image taken at each of the focal positions, and generating an in-focus image by providing a pixel corresponding to the acquired pixel value to the pixel position, in the step (iii), provided that i and j are subscripts indicating the pixel position, $x_i$ and $x_j$ are variables each of which is a natural number not larger than L, and $x_i$ is allocated to a plurality of pixel positions i as the focal positions, when a function, which is calculated by adding up a cost function $D_i(x_i)$ of each of the pixel positions i based on the focal position probability distribution calculated in the step (ii) and a penalty function $V(x_i, x_j)$ which increases as an absolute value of a difference between $x_i$ and $x_j$ increases in regard to the pixel positions i and neighboring i and j, is an evaluation function E, a combination of $x_i$ in regard to the pixel positions i, with which E is minimized, is approximately calculated by belief propagation as the optimal focal position.

According to the second aspect for achieving the second object, an object height data acquisition method includes the steps of: (i) taking L images of an object at different focal positions, which images are associated with height information calculated from the focal positions, L indicating a natural number not smaller than two; (ii) acquiring gray scale images of the object at the respective focal positions based on the images taken in the step (i); (iii) by performing multiresolution transform for the gray scale images obtained in the step (ii), generating, for each of the focal positions, a resolution-decomposed image in which a gray scale image is decomposed to components of different frequency bands; (iv) based on the resolution-decomposed image generated in the step (iii), calculating focal position probability distribution which is probability distribution regarding the focal positions, for each pixel position of the gray scale image; (v) based on the focal position probability distribution calculated in the step (iv), acquiring an optimal focal position for each of the pixel positions; and (vi) based on the optimal focal position acquired in the step (v), acquiring, for each of the pixel positions, the height information calculated from the focal position, in the step (v), provided that i and j are subscripts indicating the pixel position and $x_i$ and $x_j$ are variables each of which is a natural number not larger than L and $x_i$ is allocated to a plurality of pixel positions i as the focal positions, when a function, which is calculated by adding up a cost function $D_i(x_i)$ of each of the pixel positions i based on the focal position probability distribution calculated in the step (iv) and a penalty function $V(x_i, x_j)$ which increases as an absolute value of a difference between $x_i$ and $x_j$ increases in regard to the pixel positions i and neighboring i and j, is an evaluation function E, a combination of $x_i$ in regard to the pixel positions i, with which E is minimized, is approximately calculated by belief propagation as the optimal focal position.

An object height information acquisition device of the second aspect, for acquiring a position of an object based on L images of the object taken at different focal positions, which images are associated with height information calculated from the focal positions, L indicating a natural number not smaller than two, includes: a multiresolution transform image generator configured to, by performing multiresolution transform for gray scale images at the respective focal positions of the object, generate, for each of the focal positions, a resolution-decomposed image in which a gray scale image is decomposed to components of different frequency bands; a focal position probability calculator configured to, based on the resolution-decomposed image generated by the multiresolution transform image generator, calculate focal position probability distribution which is probability distribution regarding the focal positions, for each pixel position of the gray scale image; an optimal focal position acquisition part configured to, based on the focal position probability distribution calculated by the focal position probability calculator, acquire an optimal focal position for each of the pixel positions; and a height information acquisition part configured to acquire the height information calculated from the optimal focal position for each of the pixel positions, based on the optimal focal position acquired by the optimal focal position acquisition part, provided that i and j are subscripts indicating the pixel position and $x_i$ and $x_j$ are variables each of which is a natural number not larger than L and $x_i$ is allocated to a plurality of pixel positions i as the focal positions, when a function, which is calculated by adding up a cost function $D_i(x_i)$ of each of the pixel positions i based on the focal position probability distribution calculated by the focal position probability calculator and a penalty function $V(x_i, x_j)$ which increases as an absolute value of a difference between $x_i$ and $x_j$ increases in regard to the pixel positions i and neighboring i and j, is an evaluation function E, the optimal focal position acquisition part approximately calculates a combination of $x_i$ in regard to the pixel positions i so that E is minimized, by belief propagation.

According to the second aspect, a non-transitory computer-readable recording medium recording thereon a computer program causing a computer to acquire height information of an object based on L images of the object taken at different focal positions, which images are associated with height information calculated from the focal positions, L indicating a natural number not smaller than two, the program causing the computer to execute the steps of: (i) by performing multiresolution transform for gray scale images at the respective focal positions of the object, generating, for each of the focal positions, a resolution-decomposed image in which a gray scale image is decomposed to components of different frequency bands; (ii) based on the resolution-decomposed image generated in the step (i), calculating focal position probability distribution which is probability distribution regarding the focal positions, for each pixel position of the gray scale image; (iii) based on the focal position probability distribution calculated in the step (ii), acquiring an optimal focal position for each of the pixel positions; and (iv) acquiring the height information calculated from the optimal focal position for each of the pixel positions, based on the optimal focal position acquired in the step (iii), in the step (iii), provided that i and j are subscripts indicating the pixel position and $x_i$ and $x_j$ are variables each of which is a natural number not larger than L and $x_i$ is allocated to a plurality of pixel positions i as the focal positions, when a function, which is calculated by adding up a cost function $D_i(x_i)$ of each of the pixel positions i based on the focal position probability distribution calculated in the step (iv) and a penalty function $V(x_i, x_j)$ which increases as an absolute value of a difference between $x_i$ and $x_j$ increases in regard to the pixel positions i and neighboring i and j, is an evaluation function E, the computer is caused to approximately calculate a combination of $x_i$ in regard to the pixel positions i so that E is minimized, by belief propagation.

Advantageous Effects of Invention

According to the first aspect of the invention, an optimal focal position is approximately calculated using belief propagation. The calculated optimal focal position is set as an in-focus position, and an all-focused image is generated by obtaining pixels from a taken image corresponding to that focal position. Acquiring the optimal focal position is a question related to global areas in an image. Belief propagation is a probabilistic method for optimally solving such a question related to global areas. The present invention makes it possible to obtain an image which is properly in focus across global areas in the image, even if a problem such as image noise, saturation, and blur occurs in imaging.

According to the second aspect of the present invention, when an image of an object is taken, distance information along the optical axis direction is calculated from each focal position, and this information is associated with each focal position as height information. In the meanwhile, in the same manner as in the first aspect, an optimal focal position is approximately calculated using the belief propagation. The calculated optimal focal position is set as an in-focus position, and the height information of the object is acquired for each pixel position, from the height information corresponding to the focal position. Acquiring the optimal focal position is a question related to global areas in an image. Belief propagation is a probabilistic method for optimally solving such a question related to global areas. The present invention makes it possible to properly obtain the height information of an object based on the focal positions optimally obtained across global areas in the image, even if a problem such as image noise, saturation, and blur occurs in imaging.

BRIEF DESCRIPTION OF DRAWINGS

FIG. 8 (b) is a graph showing another example of probability distribution.

DESCRIPTION OF EMBODIMENTS

First Embodiment

Figure 1:
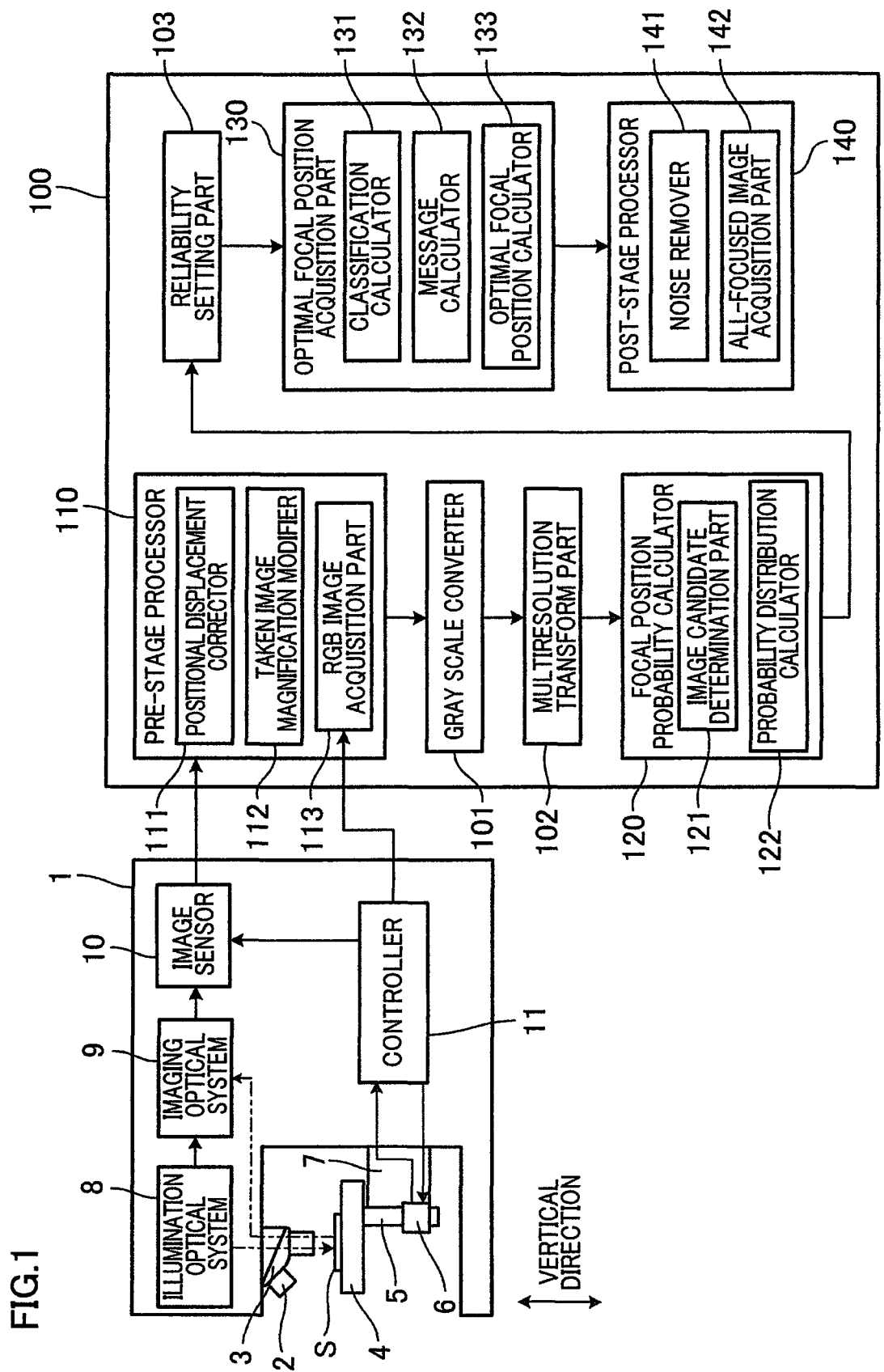
FIG. 1 is a block diagram of the structure of an all-focused image generator of First Embodiment which is an embodiment of the present invention.

With reference to figures, the following will describe an all-focused image generation method, an all-focused image generator, and an all-focused image generation program of the present invention, which are First Embodiment which is an embodiment of the present invention. The all-focused image generator of the present embodiment includes, as shown in FIG. 1, a microscope 1 for taking an enlarged image of a sample S and an image processor 100 for processing the image taken by the microscope 1. The microscope 1 includes: a revolver 3 to which a plurality of objective lenses 2 are fixed; a stage 4 on which the sample S is placed; a slider 5 to which the stage 4 is fixed at the upper end; a slider supporter 7 supporting the slider 5 to be vertically movable; and a slider moving mechanism 6 for vertically moving the slider 5 with respect to the slider supporter 7.

To the revolver 3, the objective lenses 2 which are different from one another in magnification are fixed. As the revolver 3 is rotated, the objective lens 2 facing the stage 4 below is switched to another objective lens 2. The upper surface of the stage 4 is horizontal, and the sample S can be placed on the stage 4 to be horizontal and immediately below the objective lens 2. The slider moving mechanism 6 includes a piezoelectric actuator for slightly moving the slider 5 in the vertical direction and a position sensor for highly precisely detecting the position of the slider 5 in the vertical direction. The position sensor outputs the result of the detection of the position of the slider 5 to a later-described controller 11.

In addition to the above, the microscope 1 further includes an illumination optical system 8 configured to emit illumination light to the sample S, an imaging optical system 9 configured to cause an image sensor 10 to conduct image formation from the light from the sample S, and the image sensor 10 configured to conduct the photoelectric conversion of the formed object image and output the result of the conversion. The illumination optical system 8 includes members such as an illumination light source and a reflecting mirror that guides the illumination light emitted from the light source to the sample S. The imaging optical system 9 includes a lens such as a focus lens 9a (see FIG. 2), a reflecting mirror, or the like that lead the light from the objective lens 2 to the image sensor 10 so as to form an object image. A highly-magnified object image is formed in the image sensor 10 thanks to the cooperation of the objective lens 2 and the lens in the imaging optical system 9. The image sensor 10 generates image data corresponding to the formed object image, and outputs the data to the image processor 100. This image data is constituted by sets of data indicating color pixels lined up in a x direction and a y direction which is orthogonal to the x direction. The x direction is a predetermined direction in parallel to the horizontal directions, whereas the y direction is a direction which is in parallel to the horizontal directions and orthogonal to the predetermined direction. In this image data, the color of each pixel is represented by one or some of the three primary colors of light, R (red), G (green), and B (blue). Alternatively, the color of each pixel may be represented by one or some of complementary colors Cy (cyan), Mg (magenta), Ye (yellow), and G.

The microscope 1 includes the controller 11 which is configured to control the elements. The controller 11 controls the slider moving mechanism 6 to vertically move the stage 4 to different positions. As the stage 4 is moved, the distance between the sample S on the stage 4 and the objective lens 2 is changed, with the result that the distance between the sample S on the stage 4 and the focus lens 9a is changed along the optical path. Provided that the focal length of the focus lens 9a is fixed and the distance between the focus lens 9a and the image sensor 10 is also fixed, the distance from the object to the focus lens 9a along the optical path is required to be equal to a predetermined length, in order to form a precisely in-focus object image in the image sensor 10. Hereinafter, the position of the object at which position the object image is precisely in focus through the focus lens 9a will be referred to as a focal position.

Figure 2:
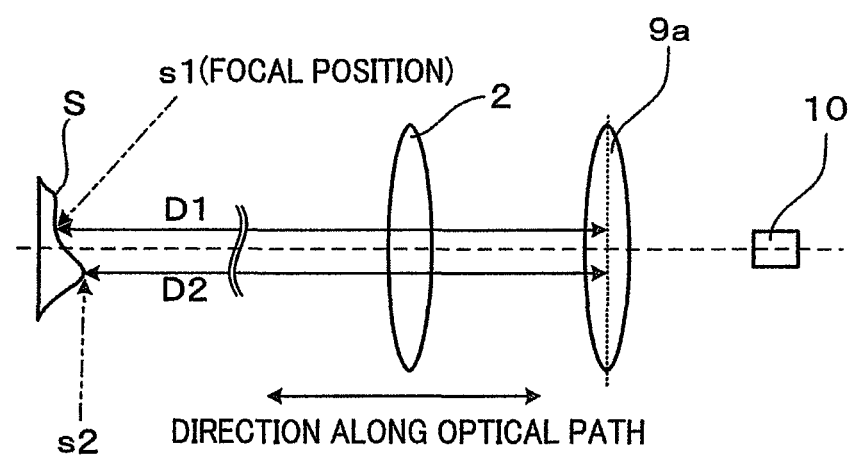
FIG. 2 is a schematic view showing the positions of a sample, a focus lens, an objective lens, and an image sensor along an optical path.

When the sample S is at the focal position through the focus lens 9a, an in-focus image of the sample S is formed on the image sensor 10. However, the high-power lens in the microscope 1 is shallow in focus depth. For this reason, when the surface of the sample S is irregular, the distance to the focus lens 9a varies at difference parts of the surface of the sample S. If such differences in distance are not negligible in terms of the focus depth, even though a particular region on the surface of the sample S is at the focal position, regions other than that particular region are not at the focal position, with the result that the image may be blurred. For example, as shown in FIG. 2, along the optical path, the distance D1 to the focus lens 9a from a region 1 on the surface of the sample S is different from the distance D2 to the focus lens 9a from a region 2 on the surface of the sample S. As such, even if the region 1 is in focus, the region 2 may be out of focus. The acquisition of an image which is in focus at all regions of an object may be achieved in such a way that pixels of in-focus regions are collected from a plurality of images that are different little by little from one another in focal positions, and then the pixels are synthesized.

To achieve this, the controller 11 controls the slider moving mechanism 6 so that the sample S is moved little by little to different focal positions, and the image sensor 10 is controlled to take object images of the sample S at the respective focal positions. Because the taken images are different little by little in focal positions, the in-focus region on the object is different little by little among the images. Each time the image sensor 10 outputs one set of image data with a different focal position to the image processor 100, the controller 11 obtains the position of the stage 4 corresponding to that focal position from the result of the detection by the position sensor in the slider moving mechanism 6, and outputs the obtained position to the image processor 100. As the processes above are repeated, the image sensor 10 outputs L (which is a natural number not smaller than 2) images taken at different focal positions, and the controller 11 outputs L sets of stage position information associated with the L images.

Based on the image data corresponding to L object images input from the image sensor 10, the image processor 100 generates image data corresponding to an all-focused image in which all pixels are in focus. For this process, the image processor 100 includes the following functional parts: a pre-stage processor 110, a gray scale converter 101, a multiresolution transform part 102, a focal position probability calculator 120, a reliability setting part 103, an optimal focal position acquisition part 130, and a post-stage processor 140.

The image processor 100 is constituted by hardware such as a CPU (Central Processing Unit) and a ROM (Read Only Memory) and software such as a program stored in the ROM. As the software causes the hardware to function as the functional parts such as the pre-stage processor 110, the image processor 100 is realized. Alternatively, the pre-stage processor 110 may be constituted by electronic circuits or the like specialized for the processing in each functional part, or electronic circuits or the like specialized for the processing in each functional part may cooperate with the combination of hardware and software functioning as the functional parts. The software constituting the image processor 100 may be stored in a storage such as a magnetic storage, an optical storage, and a USB memory. The image processor 100 may be realized such that a computer operates in accordance with software which is read from the storage.

Each functional part of the image processor 100 processes image data so as to perform a particular type of image processing for the image corresponding to the image data. As such, directly processed by each functional part is image data. However, to avoid redundancy, the disclosure below may express that each functional part directly performs image processing for an image itself. Such expression indicates that a process corresponding to that image processing is performed for image data corresponding to that image.

The pre-stage processor 110 includes a positional displacement corrector 111, a taken image magnification modifier 112, and a RGB image acquisition part 113. The positional displacement corrector 111 compares the L object images supplied from the image sensor 10 with one another and detects the positional displacement of the object in the horizontal directions. The positional displacement appears as positional displacement in the x direction and the y direction of images (see the image IM1 in FIG. 3). The positional displacement corrector 111 corrects the displacement of the object image by moving the position of the object in each object image such that the position of the object is identical among the object images at different focal positions.

The taken image magnification modifier 112 modifies the magnification of the object image based on the information of the position of the stage 4 input from the controller 11. In a particular type of the imaging optical system 9, the magnification of the taken image may vary in accordance with a change in the focal position of the object. The taken image magnification modifier 112 maintains the magnification rate in accordance with the variation of the magnification of the taken image due to the change in the focal position, in association with the position of the stage 4. With this, the taken image magnification modifier 112 calculates the magnification rate corresponding to the position of the stage 4 input from the controller 11. Based on the calculated magnification rate, the taken image magnification modifier 112 magnifies or reduces the object image. The taken image magnification modifier 112 modifies the magnification of each object image so that the L object images at different focal positions become identical in magnification.

Figure 3:
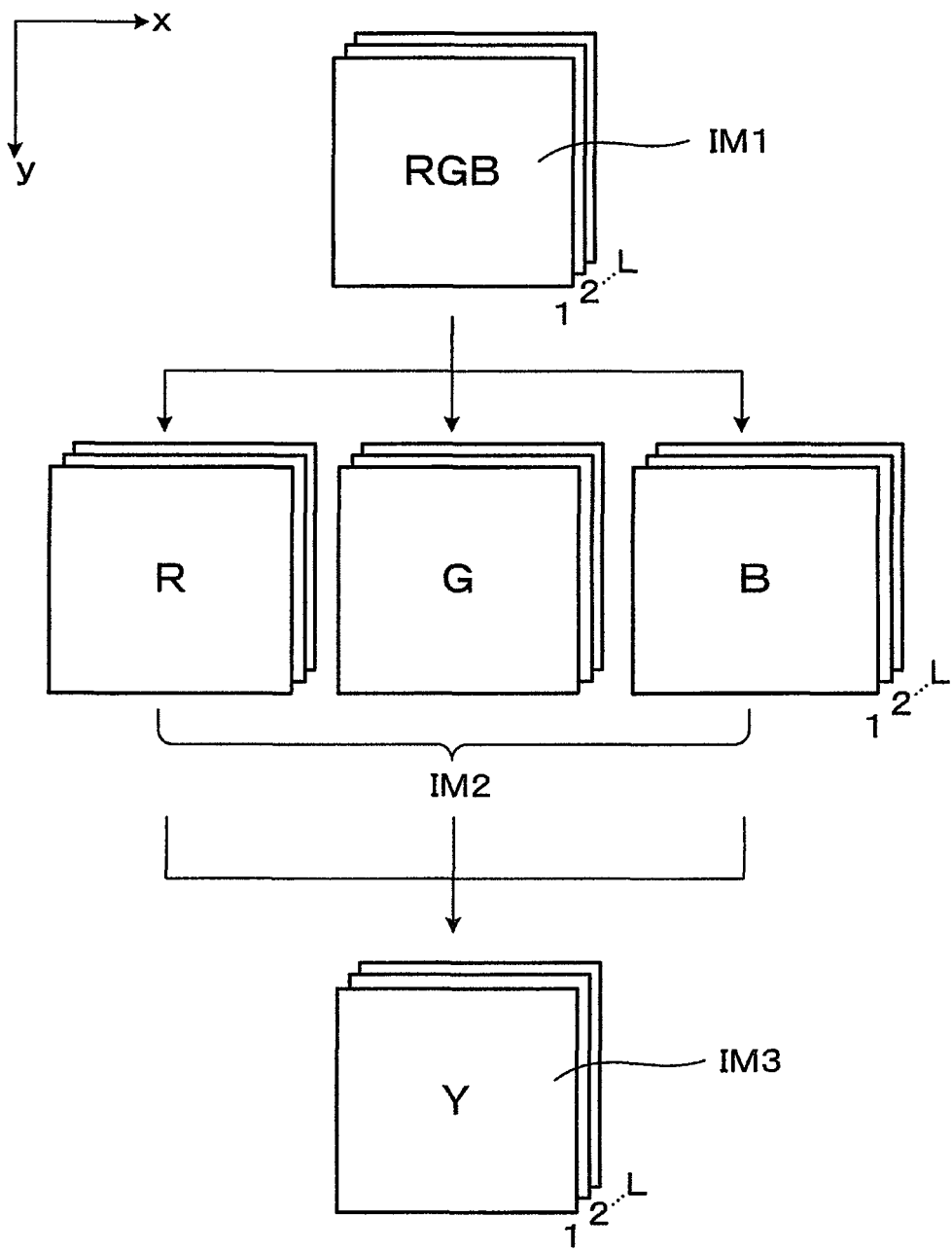
FIG. 3 is a schematic view showing images before and after the transform by an image processor.

As shown in FIG. 3, the RGB image acquisition part 113 generates RGB image data IM2 corresponding to L images IM2 with which all of the R, G, and B values are determined in each pixel, from the image data corresponding to the L object images IM1 having been modified by the positional displacement corrector 111 and the taken image magnification modifier 112. As described above, the image data corresponding to the images IM1 includes only one or some of R, G, and B values for each pixel. The RGB image acquisition part 113 therefore interpolates, for each pixel, a lacked component value based on the values of the pixels around the target pixel. For example, the RGB image acquisition part 113 calculates an interpolated pixel value by multiplying the pixel values of the pixels around the interpolation target pixel by a weighting value and then adding up these pixel values. As such, the RGB image acquisition part 113 generates the RGB image data corresponding to the images IM2, for each of the L object images with different focal positions.

As shown in FIG. 3, the gray scale converter 101 converts the RGB image data corresponding to the L images IM2 generated by the RGB image acquisition part 113 into gray scale image data corresponding to L gray scale images IM3. The conversion method can be chosen from various options. For example, when the conversion from a RGB signal to a brightness signal is done based on the NTSC (National Television System Committee) standard, the gray scale converter 101 calculates each pixel value of the gray scale image by utilizing the equation: $Y=0.298912*R+0.586611*G+0.114478*B$. In the equation, Y indicates each pixel value of the gray scale image, and R, G, and B indicate R, G, and B component values in each pixel of the RGB image.

The multiresolution transform part 102 performs multiresolution transform for an image corresponding to the gray scale image data generated by the gray scale converter 101. The multiresolution transform can be done by various methods including Gaussian pyramid transform and Laplacian pyramid transform. The present embodiment employs discrete wavelet transform. The discrete wavelet transform utilizes one of Haar Wavelet, Daubechies Wavelet, Cohen-Daubechies-Feauveau Wavelet, or the like.

The discrete wavelet transform is performed in such a way that a process of decomposing an image into a high-frequency component and a low-frequency component and a process of further decomposing the low-frequency component into a high-frequency component and a low-frequency component are repeated. As a result, a plurality of resolution-decomposed images which are images decomposed into a high-frequency component and a low-frequency component are obtained. The decomposition into a high-frequency component and a low-frequency component utilizes different filtering processes. The filters used in the filtering processes include a high-pass filter and a low-pass filter regarding the x direction of an image and a high-pass filter and a low-pass filter regarding the y direction of the image. Hereinafter, these filters regarding the directions will be referred to as a x high-pass filter, a x low-pass filter, a y high-pass filter, and a y low-pass filter.

The filtering of the image is specifically carried out as follows. The multiresolution transform part 102 stores sets of data indicating filter matrices for the respective filters. For example, the multiresolution transform part 102 stores a set of data indicating a filter matrix corresponding to the x high-pass filter and a set of data indicating a filter matrix corresponding to the y low-pass filter. Each filter matrix is constituted by a plurality of filter coefficients, and each filter coefficient is set for each of the pixels in a region to be filtered. The multiresolution transform part 102 multiplies each filter coefficient in the filter matrix by the pixel value at the position corresponding to the coefficient. The multiresolution transform part 102 then adds up the values after the multiplication, and uses the resultant value as a pixel value after the filtering. Furthermore, the multiresolution transform part 102 performs filtering processes so that the number of pixels in the entire image after the filtering processes is half as many as the number of pixels in the entire image before the filtering processes, in each of the x and y directions.

The multiresolution transform part 102 performs the first-time wavelet transform as below, by performing the filtering processes for the image data generated by the gray scale converter. To begin with, the multiresolution transform part 102 performs a filtering process using the x high-pass filter and then performs a filtering process using the y low-pass filter. As a result, from the gray scale image, a component which is a high-frequency component in the x direction and is a low-frequency component in the y direction is obtained. Hereinafter, this component will be referred to as a HL component.

In a similar manner, the multiresolution transform part 102 performs a filtering process using the x high-pass filter and then performs a filtering process using the y high-pass filter. As a result, a component which is a high-frequency component in both of the x direction and the y direction is obtained. Hereinafter, this component will be referred to as a HH component. In addition to the above, the multiresolution transform part 102 performs a filtering process using the y high-pass filter after performing a filtering process using the x low-pass filter. As a result, a component which is a low-frequency component in the x direction and is a high-frequency component in the y direction is obtained. Hereinafter, this component will be referred to as a LH component. In addition to the above, the multiresolution transform part 102 performs a filtering process using the y low-pass filter after performing a filtering process using the x low-pass filter. As a result, a component which is a low-frequency component in both of the x direction and the y direction is obtained. Hereinafter, this component will be referred to as a LL component. As such, the wavelet transform results in the generation of a resolution-decomposed image composed of a plurality of components of different frequencies, i.e., the HH component, the HL component, the LH component and the LL component, from the gray scale image. Each value in each component of the resolution-decomposed image, which is calculated by the wavelet transform, will be referred to as a wavelet coefficient (which is a transform coefficient generated by the wavelet transform).

Figure 4A:
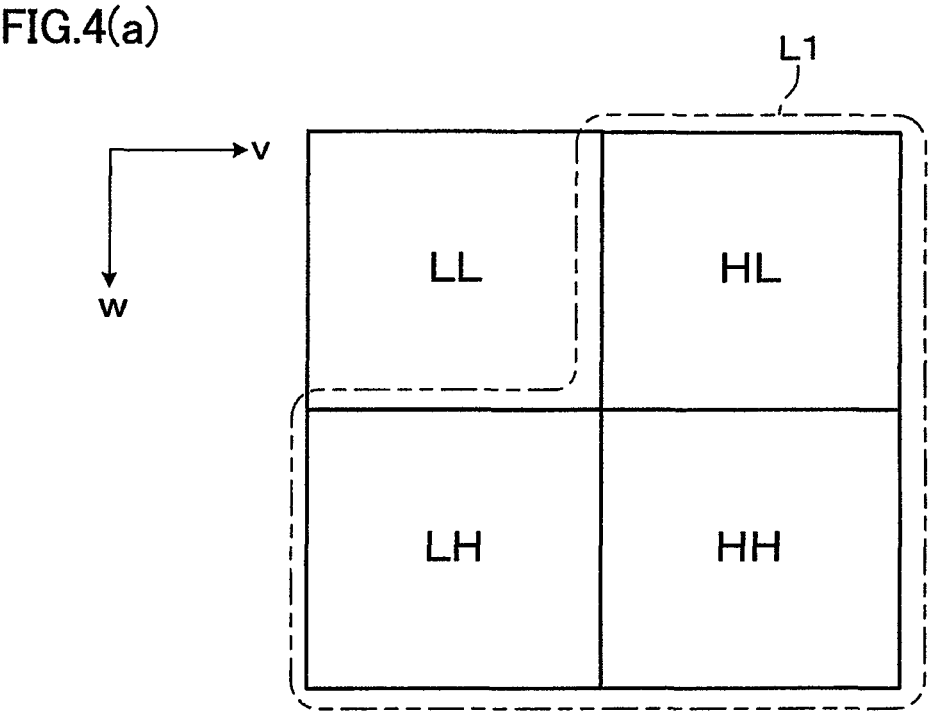
FIG. 4(a) shows multiresolution expression regarding a resolution-decomposed image generated by performing wavelet transform once.

FIG. 4(a) shows a two-by-two array of the HH component, the HL component, the LH component, and the LL component generated by the first-time wavelet transform in a v direction and a w direction which correspond to the x direction and the y direction, respectively. These components are disposed so that the HH component is at the lower right corner, the HL component is at the upper right corner, the LH component is at the lower left corner, and the LL component is at the upper left corner.

For the LL component generated by the first-time wavelet transform, the multiresolution transform part 102 performs the second-time wavelet transform in a similar manner. As a result, a HH component, a HL component, a LH component and a LL component are obtained again. As such, by the repeated wavelet transform for a LL component obtained in the previous wavelet transform, a HH component, a HL component, a LH component, and a LL component are obtained each time the wavelet transform is performed. Hereinafter, performing the wavelet transform n times (n is a natural number) will be referred to as n-level. An image IM4 shown in FIG. 4 (b) is an image in which the images are disposed at the position of the LL component of the previous wavelet transform in the disposition shown in FIG. 4(a) in each wavelet transform. Such disposition of the components in the resolution-decomposed image is termed multiresolution expression. The image IM4 shows 3-level multiresolution expression as an example.

Figure 4B:
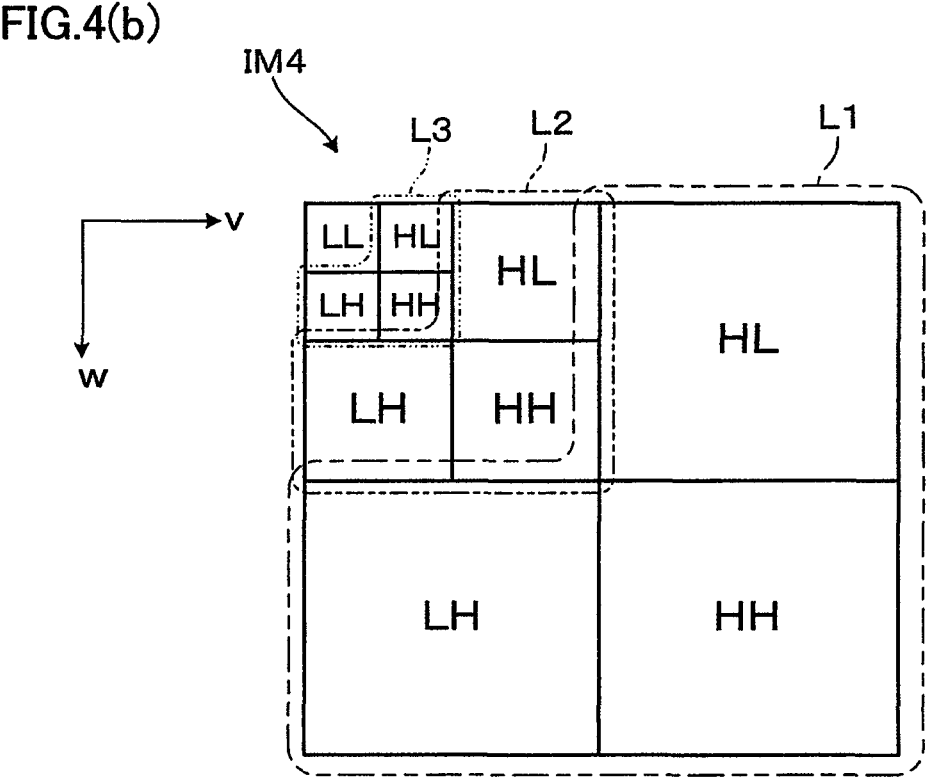
FIG. 4(b) shows multiresolution expression regarding a resolution-decomposed image generated by performing the wavelet transform three times.
Figure 5:
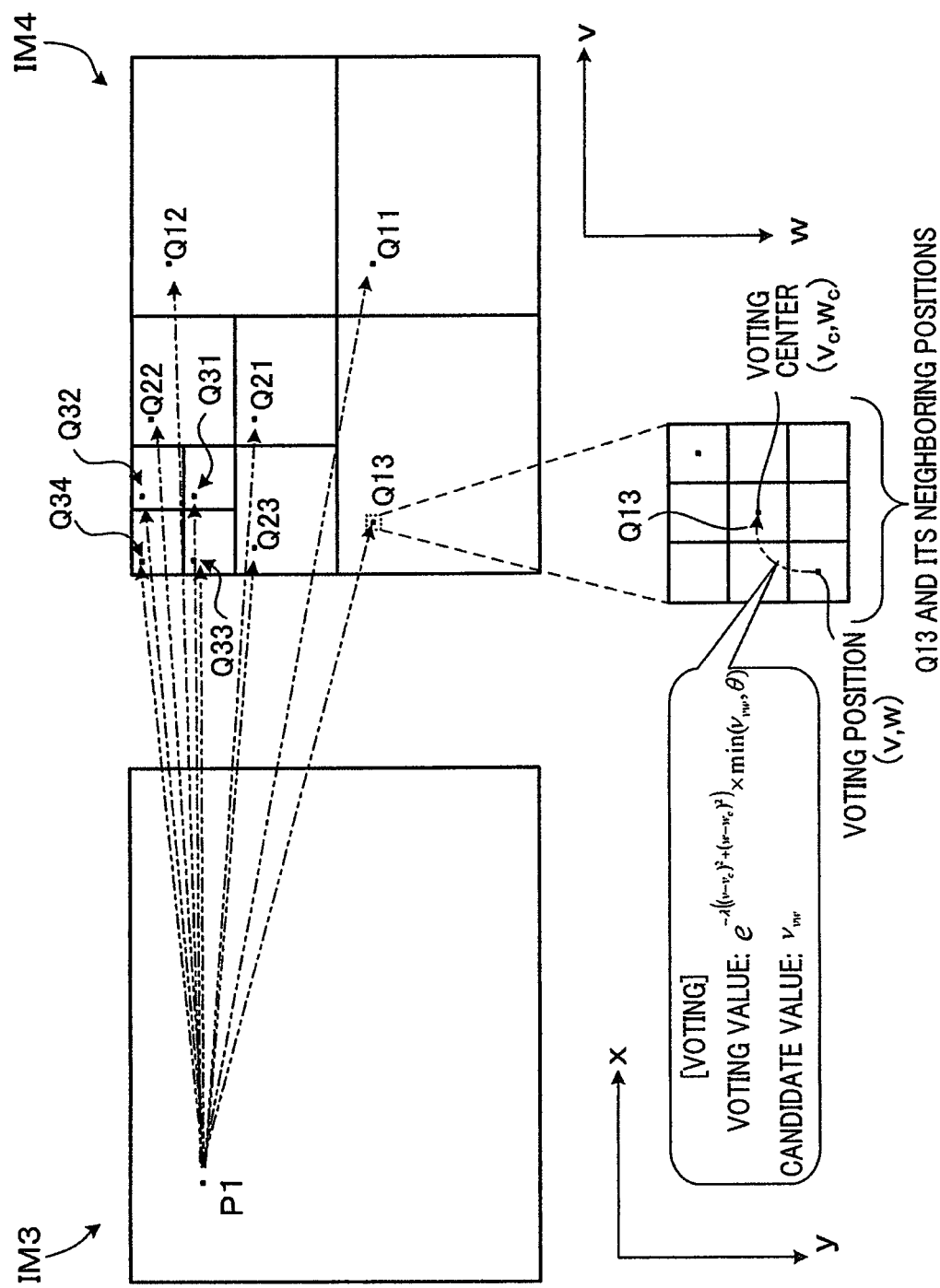
FIG. 5 shows the correspondence between the image before the wavelet transform and the image after the wavelet transform.

Such multiresolution expression is, as shown in FIG. 4(b), composed of the HH component, the HL component, and the LH component obtained in the wavelet transform of the respective times and the LL component obtained in the last-time wavelet transform. The HH component, the HL component, and the LH component of the respective levels are termed high-frequency components whereas the LL component generated last is termed a low-frequency component. In FIG. 4 (b), L1 indicates a 1-level high-frequency component, L2 indicates a 2-level high-frequency component, and L3 indicates a 3-level high-frequency component. In the multiresolution expression, the width in the v direction is identical with the width in the x direction of the gray scale image, and the width in the w direction is identical with the width in they direction of the gray scale image. Each pixel value of the gray scale image is decomposed into wavelet coefficients with different frequency bands in the multiresolution expression. For this reason, a pixel position (x, y) in the gray scale image does not one-to-one correspond to a position (v, w) in the multiresolution expression but correspond to a plurality of positions. For example, as shown in FIG. 5, a pixel P1 in the gray scale image IM3 corresponds to wavelet coefficients Q11 to Q34 which are positions corresponding to P1 in respective different frequency bands in the multiresolution expression IM4.

Figures 6A, 6B:
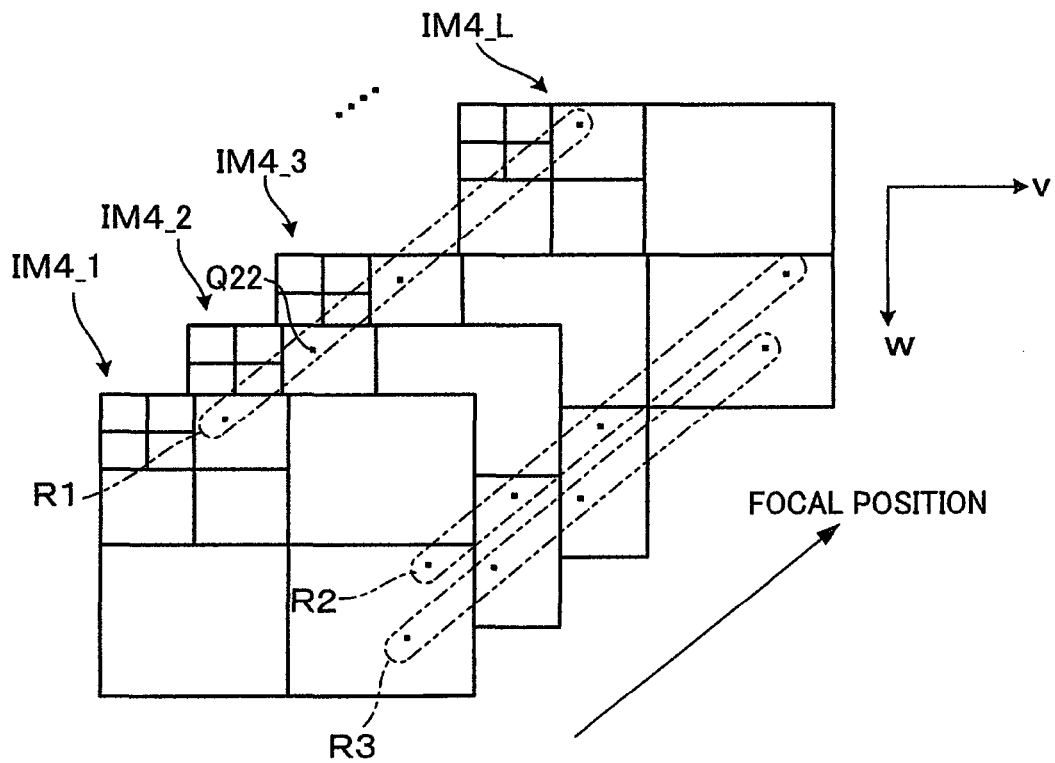
FIG. 6(a) shows L multiresolution expressions lined up at respective focal positions.
FIG. 6(b) shows an example of a wavelet coefficients sampled as candidate values and multiresolution expressions corresponding to these candidate values.

In this way, the multiresolution transform part 102 generates data corresponding to the multiresolution expression from L sets of gray scale image data with different focal positions. The multiresolution expressions IM4_1 to IM4_L shown in FIG. 6(a) indicate the L multiresolution expression above positioned at the respective focal positions. The multiresolution transform part 102 serially calculates all wavelet coefficients of the multiresolution expressions IM4_1 to IM4_L at each position in the v direction and the w direction. In other words, after all wavelet coefficients of the multiresolution expressions IM4_1 to IM4_L are serially calculated for a position in the v direction and the w direction, all wavelet coefficients of the multiresolution expressions IM4_1 to IM4_L are serially calculated for the next position in the v direction and the w direction.

For example, the points encircled by a two-dot chain line R2 in FIG. 6 (a) are identical with one another in terms of the position in the v direction and the w direction. In the meanwhile, the points encircled by a two-dot chain line R3 are identical with one another in terms of the v direction and the w direction and are different from the points encircled by R2 in the position. Based on this, for example, the multiresolution transform part 102 calculates all wavelet coefficients of the multiresolution expressions IM4_1 to IM4_L in regard to the position of the points encircled by R2 and then calculates all wavelet coefficients of the multiresolution expressions IM4_1 to IM4_L in regard to the position of the points encircled by R3. Why the multiresolution transform part 102 calculates the wavelet coefficients in this order will be described below.

The focal position probability calculator 120 calculates probability distribution (focal position probability distribution) of the focal positions based on the resolution-decomposed image generated by the multiresolution transform part 102, for each pixel position in the gray scale image. In this connection, the probability values regarding the focal position are defined as below. Hereinafter, i (which is a natural number not greater than the total number of pixels in the gray scale image) will be used as a subscript for identifying a pixel position in the gray scale image, and $x_i$ will be used as a variable which is a natural number not greater than L. Based on this, the probability distribution calculated by the focal position probability calculator 120 is represented as $P_i(x_i)$. $P_i(x_i)$ indicates a probability that the $x_i$-th image among the L images is in focus at a pixel position i. To put it differently, $P_i(x_i)$ indicates a probability that, at a pixel position i, the surface of the object is at the focal position in the $x_i$-th image among the L images.

For calculating such probability distribution, the focal position probability calculator 120 includes an image candidate determination part 121 and a probability distribution calculator 122. For each position in the v direction and the w direction in the multiresolution expression, the image candidate determination part 121 samples M (which is a natural number smaller than L) multiresolution expressions from L multiresolution expressions, as candidates for calculating the probability distribution. The number of the candidates is suitably set by means of parameter tuning. These M multiresolution expressions are obtained by sampling, from L images, M images having large absolute values of the wavelet coefficients one by one from the image having the largest absolute value, in regard to the position in the v direction and the w direction. More specifically, the image candidate determination part 121 compares images taken at different focal positions with one another in terms of the absolute value of the wavelet coefficient at the position. The image candidate determination part 121 then samples the absolute values of the wavelet coefficients one by one from the largest absolute value to the M-th largest value, and samples M multiresolution expressions corresponding to the respective sampled values. For example, in the multiresolution expressions IM4_1 to IM_4 in FIG. 6 (a), the wavelet coefficients of the positions encircled by the two-dot chain lines R1, R2, and R3 are compared with one another for each of R1 to R3. FIG. 6 (b) shows an example of the result of the sampling of M absolute values of wavelet coefficients from the largest, and the multiresolution expressions corresponding to the M wavelet coefficients.

The present embodiment is arranged so that, because the multiresolution transform part 102 and the image candidate determination part 121 cooperate as described below to perform the process of each part, the memory for storing the wavelet coefficients is only required to have a capacity sufficient to store candidate values.

As described above, the multiresolution transform part 102 serially calculates the wavelet coefficients of the same position in the v direction and the w direction for all multiresolution expressions IM4_1 to IM4_L. In the meanwhile, the image candidate determination part 121 serially stores the first to M-th wavelet coefficients calculated by the multiresolution transform part 102 in the memory which is provided to store the candidates. Subsequently, when the multiresolution transform part 102 calculates the M+1-th wavelet coefficient, the image candidate determination part 121 compares this M+1-th wavelet coefficient with the M wavelet coefficients having already been stored in the memory. When the M coefficients in the memory includes a coefficient smaller than the M+1-th coefficient, the image candidate determination part 121 replaces that coefficient in the memory with the M+1-th coefficient. As this process is repeated until the multiresolution transform part 102 calculates the wavelet coefficient of the L-th multiresolution expression, the image candidate determination part 121 selects M candidates of the wavelet coefficients for the position in the v direction and the w direction. Because the process is performed in this way, the memory capacity required for determining image candidates is restrained to a size with which M values can be stored for each position in the v direction and the w direction.

The probability distribution calculator 122 calculates the probability distribution $P_i(x_i)$ based on the wavelet coefficients sampled by the image candidate determination part 121. For each pixel position i, the probability distribution calculator 122 utilizes M candidate values at a corresponding position which is a position corresponding to that pixel position i in the multiresolution expression and at neighboring positions which are in the vicinity of the corresponding position. All of the M candidate values relate only to the high-frequency components in each multiresolution expression.

As an example, a point P1 in the gray scale image IM3 shown in FIG. 5 is assumed as the target pixel. The corresponding positions in the high-frequency component, which correspond to the point P1 in the multiresolution expression IM4, are Q11 to Q33. As an example, eight neighboring positions of each of the corresponding position Q11 to Q33 are composed of four neighboring positions in the v direction and the w direction and four positions neighboring the position in oblique directions. For example, for Q13, as shown in FIG. 5, nine candidate values, which form a three-by-three matrix composed of Q13 which is the corresponding position and the neighboring positions thereof, are used. Therefore, for Q11 to Q33, 81 candidate values in total, which are composed of the corresponding positions and their neighboring positions, are used.

Figure 7:
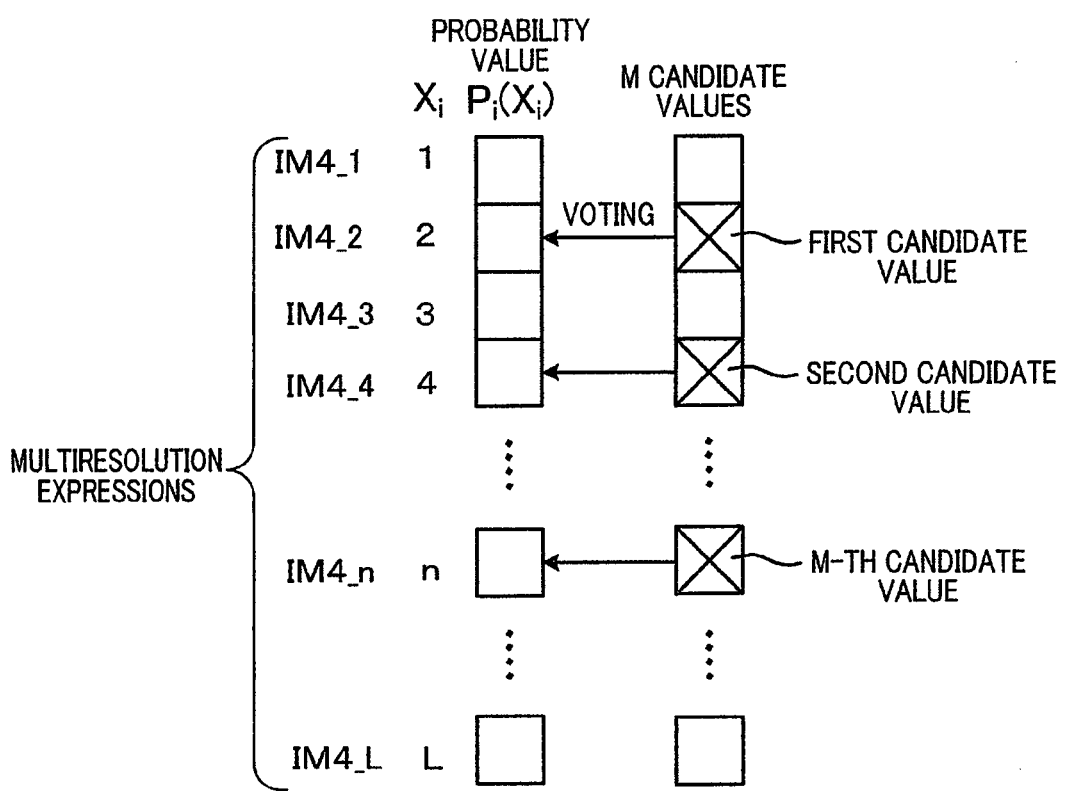
FIG. 7 is a schematic view showing how to vote for a probability value based on the candidate value.

The probability distribution calculator 122 votes a candidate value of the corresponding position or the neighboring position for the probability value $P_i(x_i)$, where the pixel position of the gray scale image corresponding to the corresponding position or the neighboring position is i and the multiresolution expression corresponding to that candidate value is IM_$x_i$. For example, assume, as shown in FIG. 7, that the first candidate value, the second candidate value, . . . and the M-th candidate value of a corresponding position are candidate values corresponding to multiresolutions IM4_2, IM_4, . . . , and IM_n (n is a natural number). In this case, the first candidate value, the second candidate value, . . . and the M-th candidate value of the corresponding position are voted for $P_i(2), P_i(4), \ldots,$ and $P_i(n)$.

To be more specific, the voting is performed by the following calculations. To begin with, $P_i(1), P_i(2), \ldots,$ and $P_i(L)$ are set at an initial value 0 for all i. Provided that the corresponding position or the neighboring position on the voting side is a voting position (v, w), the corresponding position on the voted side is a voting center ($v_c$, $w_c$) and the candidate value at the corresponding position or the neighboring position is $v_{vw}$, and the voting value corresponding to the candidate value $v_{vw}$, is calculated by Numerical Expression 1 below. The parameters λ and θ which are accordingly set are, for example, λ=0.1 and θ=1.0. The parameter min (α, β) indicates the smaller one of α and β.

$$e^{-\lambda((v-v_c)^2+(w-w_c)^2)} \times \min(v_{vw}, \theta)$$ [Numerical Expression 1]

The probability distribution calculator 122 adds the voting value calculated for each candidate value by means of Numerical Expression 1 to the probability value $P_i(x_i)$ of the multiresolution expression IM_$x_i$ corresponding to the candidate value at the pixel position i. In this regard, FIG. 5 shows an example of the voting center and the voting position, when Q13 is the corresponding position. After the voting of all candidate values regarding the pixel position i is completed, the probability distribution calculator 122 normalizes the $P_i(x_i)$ such that the norm of the entirety of $P_i(1), P_i(2), \ldots, P_i(L)$ becomes 1. The probability distribution calculator 122 performs the voting for all i. As such, the voting is performed not only from the corresponding position but also from the neighboring positions in the vicinity of the corresponding position, and the voting is done with a weight corresponding to the distance from the voting center. This makes it possible to take account of local consistency when calculating the probability distribution.

Figure 8A:
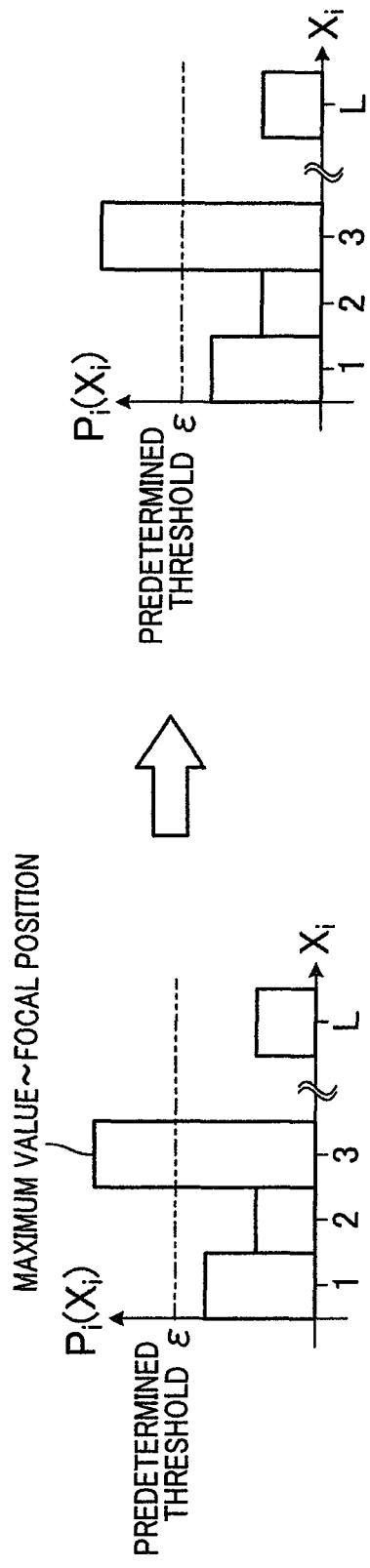
FIG. 8 (a) is a graph showing an example of probability distribution.
Figure 8B:
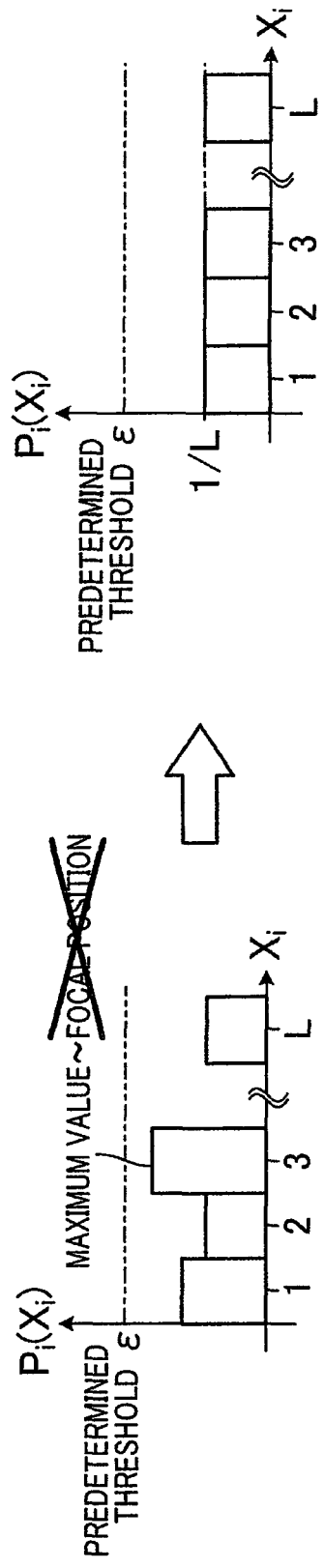

As described above, the focal position probability calculator 120 calculates the probability distribution $P_i(x_i)$ at each pixel position i of the gray scale image. As the $P_i(x_i)$ is calculated by the voting described above, among L images, the $P_i(x_i)$ is high in an image around the pixel position i, which image has a relatively large voting value. A large voting value indicates a large amplitude of high-frequency components of a wavelet coefficient. Therefore, as shown in FIG. 8 (a), $x_i$ with which $P_i(x_i)$ is maximized typically indicates an image which is most likely to be in focus, i.e., an image corresponding to the focal position. However, when a problem such as image noise, saturation, and blur occurs in image taking, as described above, $x_i$ with which the calculated $P_i(x_i)$ is maximized may indicate an image significantly far from the actual focal position as shown in FIG. 8 (b). In such a case, if the focal position is estimated using this $P_i(x_i)$, an out-of-focus position is erroneously assumed as an in-focus position.

In consideration of this problem, the reliability setting part 103 compares the maximum value in $P_i(1), P_i(2), \ldots, P_i(L)$ with a predetermined threshold. When the maximum value is equal to or smaller than the predetermined threshold, the reliability of that pixel position is set to be lower than the reliabilities in cases where the maximum value is larger than the predetermined threshold. More specifically, when the maximum value $P_i^{MAX}$ at the pixel position i of the $P_i(x_i)$ exceeds the predetermined threshold ϵ (as shown in FIG. 8 (a)), the reliability setting part 103 sets the reliability $R_i$ of the pixel position i as $R_i=1+(P_i^{MAX}-\epsilon)$. At the same time, as shown in FIG. 8 (a), the value of $P_i(x_i)$ is unchanged. In the meanwhile, when the maximum value $P_i^{MAX}$ at the pixel position i of the $P_i(x_i)$ is equal to or smaller than the predetermined threshold ϵ (as shown in FIG. 8 (b)), the reliability setting part 103 determines that the pixel position i is in the problematic region, and sets the reliability as $R_i=1$. Furthermore, as shown in FIG. 8 (b), the values of $P_i(1), P_i(2), \ldots, P_i(L)$ are all changed to 1/L with which even distribution is achieved.

The optimal focal position acquisition part 130 acquires, for each pixel position i, one of the L images with at different focal positions which is an in-focus image corresponding to the optical focal position, based on the $P_i(x_i)$ calculated by the focal position probability calculator 120 and the $R_i$ set by the reliability setting part 103. A question regarding the acquisition of an image corresponding to the optimal focal position is how the consistency across global areas in the image is assured. To solve this question, the present embodiment employs formulation by the Markov random field as described below. Determining an image corresponding the optical focal position is equivalent to the determination of which one of the first to L-th images is an image corresponding to the focal position for each pixel position i. In other words, the determination is equivalent to how $x_i=x_i^*$ providing the image corresponding to the optical focal position is allocated for $x_i$ which is a natural number selected from the range of 1 to L.

Figure 9:
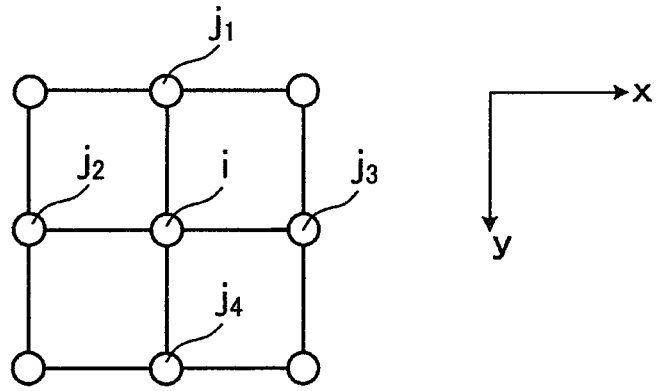
FIG. 9 is a schematic view showing the disposition of nine pixels in a three-by-three matrix. Open circles indicate pixels, respectively.

According to the Markov random field, the overall probability of the allocation {$x_i$} is determined sorely from the relationship between the allocation in a pixel position j neighboring to each pixel position i and the allocation in the pixel position i. In the present embodiment, as shown in FIG. 9, the overall probability is determined sorely from the allocation in four pixel positions $j_1$ to $j_4$ neighboring each pixel position i in the x direction and the y direction and the allocation in the pixel position i.

In such Markov random field, it has been known that a question providing the optimal allocation {$x_i^*$} is attributed to a question of determining X with which an evaluation function E (X) represented by Numerical Expression 2 below is minimized. E (X) indicates that the function relates to allocation X=($x_1, x_2, \ldots,$ and $x_N$). N indicates the total number of pixels in the gray scale image.

$$E(X) = \sum_{i \leq N} D_i(x_i) + \sum_{(i,j) \in A} V(x_i, x_j)$$ [Numerical Expression 2]

In regard to the expression, A indicates a set of paired pixels neighboring each other. In other words, j is a natural number not larger than L and is a subscript indicating a pixel position neighboring i. $D_i(x_i)$ is a cost function indicating the cost of allocating $x_i$ to the pixel position i. In the present embodiment, $D_i(x_i)$ is given by Numerical Expression 3 below. As such, $D_i(x_i)$ is represented by a product of multiplication of reliability $R_i$ set by the reliability setting part 103 by probability value $P_i(x_i)$ calculated by the focal position probability calculator 120.

$$D_i(x_i) = -R_i \times P_i(x_i)$$ [Numerical Expression 3]

$V(x_i, x_j)$ is a penalty function indicating penalty when $x_i$ and $x_j$ are allocated to paired pixel positions i and j which neighbor each other. It is noted that $V(x_i, x_j)$ is called as a smoothing term because it is a function with which, the more the degree of difference between the allocations to pixels neighboring each other is, the more the penalty is. In the present embodiment, $V(x_i, x_j)$ is given by Numerical Expression 4 below. As such, $V(x_i, x_j)$ has a value in proportion to the absolute value of the difference between allocated $x_i$ and $x_j$.

$$V(x_i, x_j) = \min\left(\frac{|x_i - x_j|}{L}, 1\right) \quad \text{[Numerical Expression 4]}$$

A question minimizing E(X) is solved by belief propagation. It has been known that a solution close to a global optimal solution is obtained by the belief propagation in many cases. Examples of the application of the belief propagation include computation of parallax for stereoscopy and the solution of so-called image region division. To solve the question of minimizing E(X) based on the belief propagation, the optimal focal position acquisition part 130 includes a classification calculator 131, a message calculator 132, and an optimal focal position calculator 133.

To begin with, the classification calculator 131 calculates the cost function $D_i(x_i)$ for all pixel positions i, based on the Numerical Expression 3 above. Then the cost function $D_i(x_i)$ is down-sampled. For example, a cost function $D_i^1(x_i^1)$ which is ½ in the number of pixels in the x direction and the y direction is calculated. The down-sampling may be done by thinning which is performed in such a way that every other value is sampled from the cost function $D_i(x_i)$ in the x direction and the y direction. Alternatively, the values $D_i(x_i)$ of the target pixel and pixels neighboring the same are added up or a weighted average of these values is calculated for every other pixel in the x direction and the y direction. Furthermore, as $D_i^1(x_i^1)$ is down-sampled in a similar manner, $D_i^2(x_i^2)$ is obtained. As such, by performing the down-sampling n times (n is a natural number), the classification calculator 131 obtains multi-level low-resolution cost functions $D_i^1(x_i^1)$, $D_i^2(x_i^2)$, ..., and $D_i^n(x_i^n)$. Hereinafter, an original cost function before down-sampling will be referred to as $D_i^0(x_i^0)$ in accordance with the expression of the low-resolution cost function.

Based on the cost functions $D_i^0(x_i^0)$, $D_i^1(x_i^1)$, $D_i^2(x_i^2)$, ..., and $D_i^n(x_i^n)$ calculated by the classification calculator 131, the message calculator 132 repeatedly calculates a message $m_{i \to j}^{t\ k}$ represented by Numerical Expression 5 below. $m_{i \to j}^{t\ k}[x_j^k]$ indicates a propagation message value from a pixel position i to a neighboring pixel position j in the t-th repetition. Because $x_j^k$ is a variable of one of 1 to L, $m_{i \to j}^{t\ k}$ has L elements. Ne(i)\j indicates a set of pixel positions neighboring the pixel position i, excluding the pixel position j. k is an integer which is 0 or more and n or less, indicating a level.

$$m_{i \to j}^{t}[x_j^k] = \quad \text{[Numerical Expression 5]}$$
$$\min_{x_i^k}\left(V(x_i^k, x_j^k) + D_i^k(x_i) + \sum_{s \in Ne(i)\setminus j} m_{s \to i}^{t-1\ k}[x_i^k]\right)$$

To begin with, the message calculator 132 calculates messages when k=n, in the order of t=0, 1, 2, and so on. An initial value $m_{i \to j}^{0\ n}$ when t=0 is set at zero. In regard to the above, an operator in which $x_i^k$ is provided below min(α) gives the minimum value of a in regard to $x_i^k$. Messages when k=n are calculated as below. It is presupposed that, when a message of t(t≥1) is calculated, all messages of t−1 or smaller have already been calculated. To begin with, as indicated by Numerical Expression 6 below, the bracketed part after min in Numerical Expression 5 is calculated by serially substituting a $x_j^n$ with $x_i^n$=1, 2, ..., and L. Subsequently, the smallest one of the values calculated based on Numerical Expression 6 is sampled. This value is the value of $m_{i \to j}^{t\ n}[x_j^n]$ in regard to the $x_j^n$. As this operation is repeated serially for $x_j^n$=1, 2, ..., and L, the $m_{i \to j}^{t\ n}[x_j^n]$ is calculated for all $x_j^n$. By repeating the operation above for all neighboring i and j, all messages $m_{i \to j}^{t\ n}[x_j^n]$ are calculated for a particular t. The message calculator 132 repeats such calculation of the messages $m_{i \to j}^{t\ n}$ for t=0, 1, 2, and so on in this order, until t reaches T where the $m_{i \to j}^{t\ n}$ converges.

$$V(1, x_j^n) + D_i^n(1) + \sum_{s \in Ne(i)\setminus j} m_{s \to i}^{t-1\ n}[1] \quad \text{[Numerical Expression 6]}$$
$$V(2, x_j^n) + D_i^n(2) + \sum_{s \in Ne(i)\setminus j} m_{s \to i}^{t-1\ n}[2]$$
$$...$$
$$V(L, x_j^n) + D_i^n(1) + \sum_{s \in Ne(i)\setminus j} m_{s \to i}^{t-1\ n}[L]$$

Figure 10:
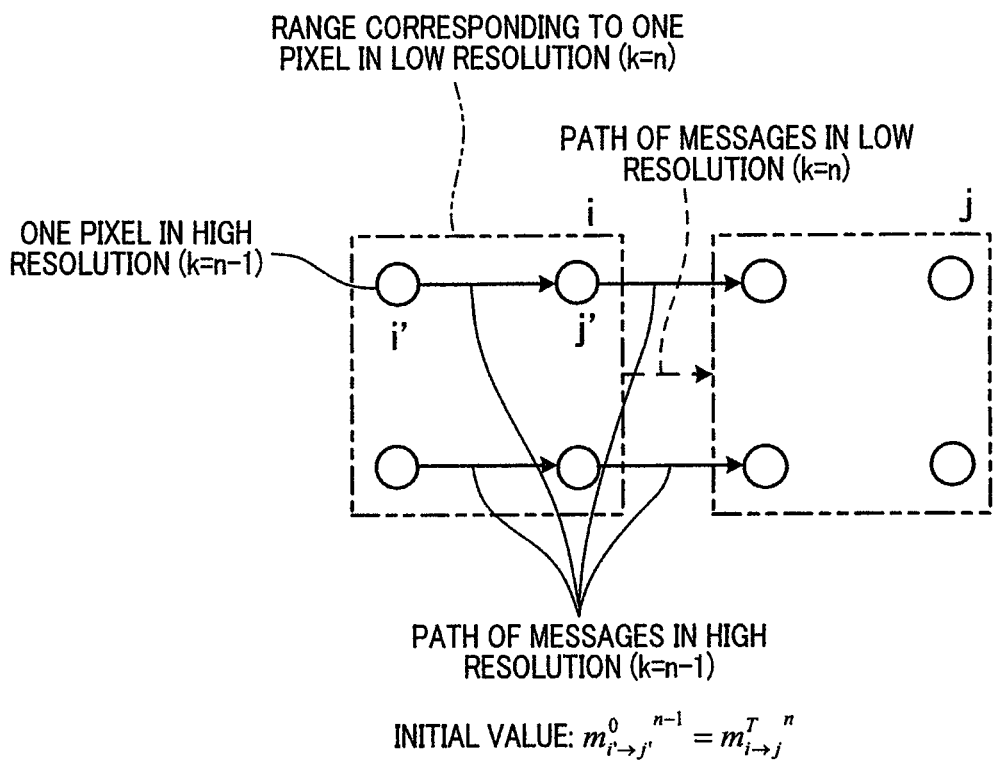
FIG. 10 is a schematic view showing the relationship between the pixel disposition in high resolution and one pixel in low resolution.

Subsequently, the message calculator 132 calculates messages $m_{i \to j}^{t\ n-1}$ when k=n−1, in the resolution which is higher than k=n by one level. An initial value of messages in this case is a convergence value $m_{i \to j}^{t\ n}$ of the messages calculated in the low resolution (k=n). The convergence value $m_{i \to j}^{t\ n}$ is used as an initial value of messages in all paths in a high resolution k=n−1 corresponding to the paths from the pixel position i to the pixel position j in the low resolution. For example, as shown in FIG. 10, assume that the range corresponding to one pixel in the low resolution corresponds to the range of pixels in a two-by-two matrix in a high resolution. In this case, the convergence value $m_{i \to j}^{t\ n}$ of the messages corresponding to the paths indicated by dotted arrows in the low resolution is used as a shared initial value of the messages corresponding to the paths in the high resolution indicated by four full-line arrows, which correspond to the paths in the low resolution. The message calculator 132 repeats the calculation of the message $m_{i \to j}^{t\ n}$ when k=n−1 serially in the order of t=0, 1, 2, and so on, until the convergence. The convergence value is, in a manner similar to the above, used as an initial value of messages of a higher resolution (k=n−2). As such, the message calculator 132 repeats the calculation of message $m_{i \to j}^{t\ k}$ serially for k=n, n−1, ..., 2, 1, and 0 in this order.

The optimal focal position calculator 133 then calculates $x_i^*$ indicating an image corresponding to the optimal focal position based on Numerical Expression 7 below, by using the convergence value $m_{i \to j}^{t\ 0}$ of the messages finally obtained.

$$x_i^* = \min_{x_i^0}\left(D_i^0(x_i^0) + \sum_{j \in Ne(i)} m_{j \to i}^{T\ 0}[x_i^0]\right) \quad \text{[Numerical Expression 7]}$$

The post-stage processor 140 acquires an all-focused image in which all pixels are in focus, based on $x_i^*$ acquired by the optimal focal position acquisition part 130. The post-stage processor 140 includes a noise remover 141 and an all-focused image acquisition part 142. The noise remover 141 performs a noise removal process using a Gaussian filter or a median filter for the $x_i^*$ acquired by the optimal focal position acquisition part 130. As descried above, because the $x_i^*$ is acquired based on belief propagation with which global optimization is possible, an estimation error in low frequencies is unlikely to occur. For this reason, it is possible to use a filter having a relatively small filter kernel.

The all-focused image acquisition part 142 acquires an all-focused image based on $x_i^*$ from which noise has been removed by the noise remover 141. The $x_i^*$ indicates that, at a pixel position i, which image is in focus among L images. In accordance with this, the all-focused image acquisition part 142 acquires a pixel value of the $x_i^*$-th image in each pixel position i of the image IM2 shown in FIG. 3. The all-focused image acquisition part 142 then acquires the all-focused image by rearranging the pixel obtained for each pixel position i to a corresponding position.

Figure 11:
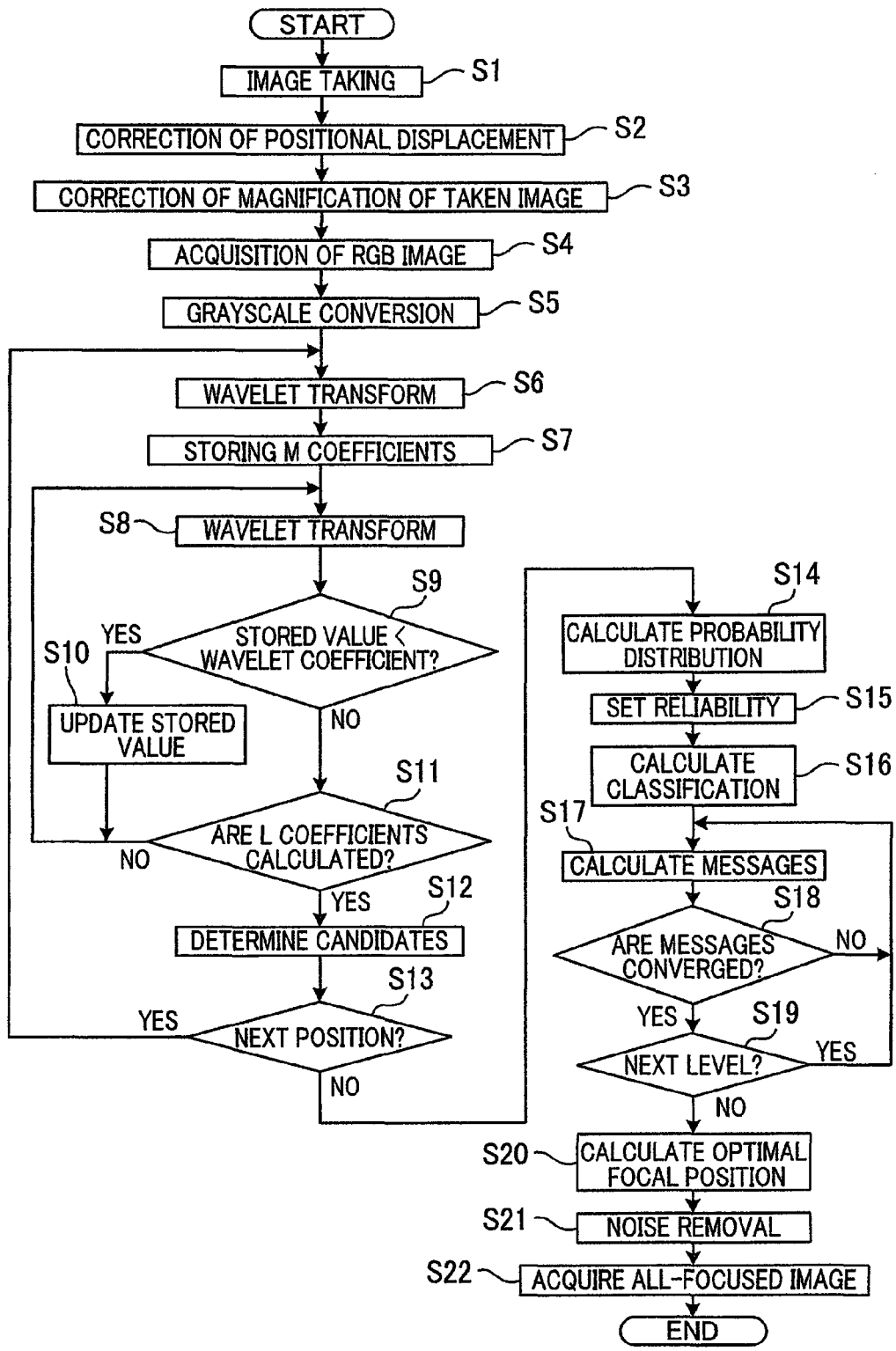
FIG. 11 is a flowchart of the overall flow of a process executed by a microscope and an image processor.

The following will describe the overall flow of the processes executed by the microscope 1 and the image processor 100 with reference to FIG. 11. The processes executed in accordance with the steps shown in FIG. 11 correspond to the all-focused image generation method of the present invention. The processes may be executed by the cooperation of the hardware and software constituting the image processor 100 as described above. The software in this case corresponds to the all-focused image generation program of the present invention.

To begin with, the microscope 1 moves the position of the stage 4 and takes L object images at different focal positions (step S1). These object images are sent to the image processor 100 together with sets of positional information of the stage 4 associated with the respective focal positions. Subsequently, in the image processor 100, the positional displacement corrector 111 corrects the positional displacement in the image in the x direction and the y direction, which corresponds to the horizontal positional displacement of the object (step S2). Then the taken image magnification modifier 112 corrects the magnification of the object image based on the position of the stage 4 input from the microscope 1 for each object image (step S3). Then the RGB image acquisition part 113 generates L images IM2 in which all of R, G, and B component values are determined for each pixel, based on the L images IM1 having been corrected in terms of the positional displacement and the magnification (step S4).

Then the gray scale converter 101 generates L gray scale images IM3 from the L images IM2 (step S5; see FIG. 3). Then the multiresolution transform part 102 performs wavelet transform for the gray scale images IM3 (step S6). In so doing, the multiresolution transform part 102 serially calculates L wavelet coefficients of the multiresolution expressions IM4_1 to IM4_L for each positions in the v direction and the w direction (see FIG. 6). In the meanwhile, the image candidate determination part 121 serially stores the calculated wavelet coefficients in a memory until the multiresolution transform part 102 calculates the first M values (step S7).

Subsequently, each time the multiresolution transform part 102 calculates M+1-th and following wavelet coefficients (step S8), the image candidate determination part 121 determines whether the M values having already stored in the memory include a value smaller than a newly-calculated wavelet coefficient (step S9). When such a value is included (step S9, Yes), the image candidate determination part 121 replaces that value in the memory with the newly-calculated wavelet coefficient (step S10). In the meanwhile, when such a value is not included (step S9, No), the image candidate determination part 121 determines whether L wavelet coefficients have already been calculated for the position (step S11). When the number of wavelet coefficients has not reached L (step S11, No), the process goes back to the step S8. In the meanwhile, when the number has reached L (step S11, Yes), the image candidate determination part 121 selects M values stored in the memory at this moment as candidates of the wavelet coefficients at the position (step S12). It is noted that the steps S6 and S8 correspond to a multiresolution image generation step. Furthermore, the steps S7 and S9 to S12 corresponds to a sampling step.

Subsequently, the image candidate determination part 121 determines whether there remains a position for which wavelet coefficients must be calculated (step S13). When there remains a position for which wavelet coefficients must be calculated (step S13, Yes), the process goes back to the step S6. When wavelet coefficients have been calculated for all positions in the v direction and the w direction (step S13, No), the process goes to the step S14.

Then the probability distribution calculator 122 calculates the probability distribution $P_i(x_i)$ at each pixel position i based on the candidate values determined by the image candidate determination part 121 (step S14). It is noted that the steps S7, S9 to S12, and S14 correspond to a focal position probability calculation step of the present invention. Then the reliability setting part 103 calculates the reliability $R_i$ for each pixel position i based on the $P_i(x_i)$ (step S15). Then the classification calculator 131 calculates a cost function $D_i(x_i)$ based on the probability distribution $P_i(x_i)$ calculated by the probability distribution calculator 122 and the reliability $R_i$ set by the reliability setting part 103, and obtains a cost function $D_i^k(x_i^k)$ (k=1, 2, ..., n) of the low resolution (step S16).

Then the message calculator 132 calculates messages $m^t_{i \to j}{}^k [x_j]$ for k=n, n−1, ..., 1, and 0 in this order (step S17). The message calculator 132 repeatedly calculates the messages until t reaches T where messages converge (step S18, No and then step S17). When the messages converge (step S18, Yes), the message calculator 132 calculates messages for the next level (step S17) if the next level exists (step S19, Yes). When the next level does not exist (step S19, No), the optimal focal position calculator 133 calculates $x_i^*$ indicating an image corresponding to an optimal focal position, using the message $m^t_{i \to j}{}^0$ where the convergence is eventually achieved (step S20). It is noted that the steps S16 to S20 correspond to an optimal focal position acquisition step of the present invention. Furthermore, the steps S17 and S18 correspond to a message calculation step of the present invention.

Then the noise remover 141 removes noise from the $x_i^*$ (step S21), and thereafter the all-focused image acquisition part 142 obtains an all-focused image in which all pixel positions i are in focus, based on the $x_i^*$ from which noise has been removed by the noise remover 141 (step S22).

According to the embodiment described above, $x_i^*$ indicating an image corresponding to an optimal focal position is obtained for each pixel position i, by solving a question of minimizing the evaluation function E(X) using the belief propagation. The question of minimizing the evaluation function E(X) relates to global areas in an image. Furthermore, the belief propagation is a probabilistic method for optimally solving such a global question. The present embodiment makes it possible to obtain an image which is properly in focus across global areas in the image, even if a problem such as image noise, saturation, and blur occurs in imaging.

In addition to the above, in the present embodiment, in the calculation of messages by the belief propagation, the messages are calculated in a higher resolution while a result of the calculation of the messages in the low resolution is set as an initial value. Because in the calculation in a high resolution the messages are updated using a value closer to the optimal solution as an initial value, the possibility of disadvantageously obtaining a local solution is further reduced.

Second Embodiment

Figure 12:
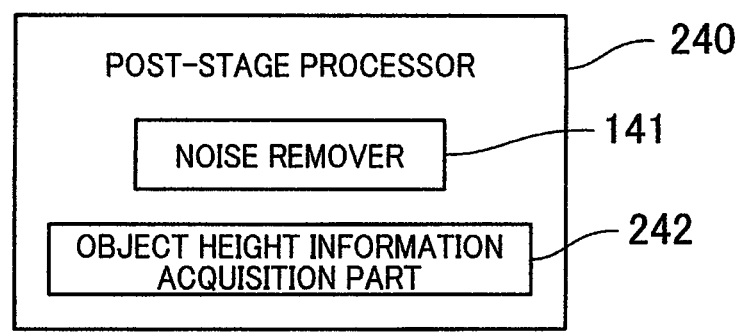
FIG. 12 is a block diagram showing elements of Second Embodiment which is another embodiment of the present invention, which elements do not appear in First Embodiment.

The following will describe an object height data acquisition method, an object height information acquisition device, and an object height information acquisition program of Second Embodiment of the present invention. The object height information acquisition device of Second Embodiment is different from the all-focused image generator of First Embodiment solely in that a post-stage processor 240 shown in FIG. 12 is provided in place of the post-stage processor 100. Furthermore, the post-stage processor 240 is different from the post-stage processor 100 solely in that an object height information acquisition part 242 is provided in place of the all-focused image acquisition part 142. In the object height information acquisition device of Second Embodiment, after the execution of the steps S1 to S21 in FIG. 11, the object height information acquisition part 242 acquires the position of an object based on $x_i^*$.

The object image represented by $x_i^*$ corresponds to an image which is taken when a region on the surface of the object, which region corresponds to a pixel position i, is in focus through the focus lens 9a. For this reason, the object height information acquisition part 242 acquires the position of the stage 4 when the image represented by the $x_i^*$ is taken, based on the positional information of the stage 4 sent from the controller 11 of the microscope 1. With reference to this position of the stage 4, a relative vertical position of each region in the object is obtained.

For example, as shown in FIG. 2, assume that the focus lens 9a is focused when the distance along the optical path is D1. In other words, in the state shown in FIG. 2, a region s1 is in focus on the surface of a sample S. In the meanwhile, to cause a region s2 to be in focus, it is necessary to move the sample S until the distance between the region s2 and the focus lens 9a becomes D1. For this reason, based on the difference between the position of the stage 4 when the region s1 is in focus and the position of the stage 4 when the region s2 is in focus, it is possible to acquire a difference D1-D2 between the position of the region s1 and the position of the region s2. As such, the object height information acquisition part 242 acquires relative height information of the entire surface of the object by obtaining relative height information of each region on the surface of the object, which region corresponds to each pixel position i.

Because $x_i^*$ is obtained in Second Embodiment in the same manner as in First Embodiment, it is possible to suitably acquire the position of the object across global areas in the image, even if a problem such as image noise, saturation, and blur occurs in image taking. It is noted that, the execution of the steps S1 to S21 shown in FIG. 11 by the object height information acquisition device of Second Embodiment and the acquisition of the position of the object by the object height information acquisition part 242 based on $x_i^*$ correspond to the object height data acquisition method of the present invention. Furthermore, a program for executing the processes above corresponds to the object height information acquisition program of the present invention. The parameters used in Second Embodiment may be different from the parameters used in First Embodiment.

(Variations) While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

[1] In the embodiments above, the gray scale converter 101 generates gray scale image data from RGB image data. Alternatively, the image sensor 10 may directly generate a gray scale image. Furthermore, an image constituted solely by G pixels generated by the image sensor 10 may be used as a gray scale image.

[2] In the embodiments above, the image candidate determination part 121 samples M (M<L) multiresolution expressions as candidates for calculating probability distribution. Alternatively, the probability distribution may be calculated from all L multiresolution expressions. However, the inventors have found that, because the image quality may be deteriorated when all multiresolution expressions are used, sampling of M candidates is preferable.

[3] In the embodiments above, to calculate the probability distribution, a voting value calculated using predetermined weight from M candidate values at the corresponding position and the neighboring positions is voted. In this regard, the voting may be done solely from the corresponding position and not from the neighboring positions.

[4] In the embodiment above, messages are calculated by a cost function of the low resolution, which is generated by down-sampling a cost function $D_i(x_i)$. Alternatively, a message function may be calculated by directly using the cost function without down-sampling the same. Furthermore, $P_i(x_i)$ may be directly used as the cost function in place of the product of multiplication of the $P_i(x_i)$ by the reliability $R_i$.

[5] In the embodiments above, the present invention is applied for cases where an object image is taken by the microscope 1. In addition to this, the present invention is applicable for optical systems other than the microscope, such as digital cameras, digital video cameras, and microscopes.

[6] In the embodiments above, the all-focused image generator and the object height information acquisition device include the microscope 1 (optical system) and the image processor 100. Alternatively, the present invention may be realized as an image processor independent from the optical system. In such a case, for example, in an imaging device independent from an image processor, images are taken at different focal positions and then sets of data corresponding to these images are recorded onto a recording medium such as an optical recording medium. The image processor includes a reader for reading data from this recording medium, and reads out image data from the recording medium and performs image processing for the image data read out, in a similar manner as in the above-described image processor.

[7] While the embodiments above employ the belief propagation as a method for global optimization, other methods such as mean field approximation and graph cut may be used.

INDUSTRIAL APPLICABILITY

The present invention is usable for sampling, for each pixel, a proper image at a correct focal position from a plurality of object images at different focal positions.

REFERENCE NUMERALS

1 MICROSCOPE, 100 IMAGE PROCESSOR, 110 PRE-STAGE PROCESSOR, 101 GRAY SCALE CONVERTER, 102 MULTIRESOLUTION TRANSFORM PART, 120 FOCAL POSITION PROBABILITY CALCULATOR, 103 RELIABILITY SETTING PART, 130 OPTIMAL FOCAL POSITION ACQUISITION PART, 140 POST-STAGE PROCESSOR

The invention claimed is:

1. An all-focused image generation method comprising the steps of:
   (i) taking L images of an object at different focal positions, L indicating a natural number not smaller than two;
   (ii) acquiring gray scale images of the object at the respective focal positions based on the images taken in the step (i);
   (iii) by performing multiresolution transform for the gray scale images obtained in the step (ii), generating, for each of the focal positions, a resolution-decomposed image in which a gray scale image is decomposed to components of different frequency bands;
   (iv) based on the resolution-decomposed image generated in the step (iii), calculating focal position probability distribution which is probability distribution regarding the focal positions, for each pixel position of the gray scale image;
   (v) based on the focal position probability distribution calculated in the step (iv), acquiring an optimal focal position for each of the pixel positions; and
   (vi) based on the optimal focal position acquired in the step (v), acquiring, for each of the pixel positions, a pixel value corresponding to the optimal focal position from the images at the focal positions taken in the step (i), and generating an in-focus image by providing a pixel corresponding to the acquired pixel value to the pixel position, in the step (v),
   provided that i and j are subscripts indicating the pixel position, $x_i$ and $x_j$ are variables each of which is a natural number not larger than L, and $x_i$ is allocated to a plurality of pixel positions i as the focal positions, when a function, which is calculated by adding up a cost function $D_i(x_i)$ of each of the pixel positions i based on the focal position probability distribution calculated in the step (iv) and a penalty function $V(x_i, x_j)$ which increases as an absolute value of a difference between $x_i$ and $x_j$ increases in regard to the pixel positions i and neighboring i and j, is an evaluation function E, a combination of $x_i$ in regard to the pixel positions i, with which E is minimized, being approximately calculated by belief propagation as the optimal focal position.

2. The method according to claim 1, wherein, the step (iv) includes the sub-steps of:
   (1) comparing transform coefficients of resolution-decomposed images at different focal positions, which are generated in the step (iii), with each other for each pixel in the resolution-decomposed images, sampling a predetermined number of transform coefficients from the compared transform coefficients serially from a transform coefficient having a largest absolute value in descending order, and sampling the focal position of the resolution-decomposed image corresponding to each sampled transform coefficient; and
   (2) in regard to a corresponding position which is a position of the resolution-decomposed image corresponding to the pixel position i and neighboring positions neighboring the corresponding position in each of a plurality of high-frequency components excluding a low-frequency component among the frequency components, adding a weight corresponding to each transform coefficient sampled in the step (1) as a probability value regarding the pixel position i of the focal position corresponding to that transform coefficient.

3. The method according to claim 2, wherein, provided that the neighboring position is (v, w), the corresponding position is $(v_c, w_c)$, the $v_{vw}$ is a transform coefficient sampled in the step (1) in regard to the neighboring position (v, w), and λ and θ are predetermined constants, the weight corresponding to the transform coefficient is in proportion to a value represented by Numerical Expression 1.

$$e^{-\lambda((v-v_c)^2+(w-w_c)^2)} \times \min(v_{vw}, \theta) \qquad \text{[Numerical Expression 1]}$$

4. The method according to claim 1, wherein, the step (v) further includes the sub-steps of:
   (3) calculating messages $m^t_{i \to j}$ represented by Numerical Expression 2 for all neighboring i and j and $x_j$ in the order of t=0, 1, 2, ..., and T, until t reaches T where the messages converge; and
   (4) calculating the optimal focal position $x_i^*$ by Numerical Expression 3.

$$m^t_{i \to j}[x_j] = \qquad \text{[Numerical Expression 2]}$$
$$\min_{x_i}\left(V(x_i, x_j) + D_i(x_i) + \sum_{s \in Ne(i) \setminus j} m^{t-1}_{s \to i}[x_i]\right)$$

$$x_i^* = \min_{x_i}\left(D_i(x_i) + \sum_{j \in Ne(i)} m^T_{j \to i}[x_i]\right) \qquad \text{[Numerical Expression 3]}$$

5. The method according to claim 4, wherein, the step (iv) further includes the sub-steps of:
   (5) from a cost value calculated by $D_i(x_i)$ in an original resolution, calculating a cost value of a low resolution by performing down sampling at least once;
   (6) executing the sub-step (3) based on the cost value in the low resolution calculated in the sub-step (5) and the penalty function; and
   (7) executing the sub-step (3) based on a cost value of a higher resolution, using messages calculated until the convergence in the sub-step (6) as an initial value.

6. The method according to claim 4, further comprising the step of:
   (vii) based on the focal position probability distribution calculated in the step (iv), setting, when a maximum value of the focal position probability distribution in that pixel position is not larger than a predetermined threshold, a reliability of each of the pixel positions to be lower than the reliability when the maximum value is higher than the predetermined threshold,
   $D_i(x_1)$ being a function that increases as the reliability at the pixel position i set in the step (vii) decreases.

7. The method according to claim 6, wherein, provided that $P_i(x_i)$ indicates a probability value at a pixel position i and the focal position $x_i$ in the focal position probability distribution and R indicates the reliability at the pixel position i set in the step (vii), $D_i(x_i)$ and $V(x_i, x_j)$ are represented by Numerical Expressions 4 and 5.

$$D_i(x_i) = -R_i \times P_i(x_i) \qquad \text{[Numerical Expression 4]}$$

$$V(x_i, x_j) = \min\left(\frac{|x_i - x_j|}{L}, 1\right) \qquad \text{[Numerical Expression 5]}$$

8. An all-focused image generator for generating an in-focus image of an object from L object images taken at different focal positions, L indicating a natural number not smaller than two, comprising:
   a memory; and
   a processor coupled to the memory, the processor configured to execute instructions stored in the memory, the instructions comprising:

a multiresolution transform image generator configured to, by performing multiresolution transform for gray scale images at the respective focal positions of the object, generate, for each of the focal positions, a resolution-decomposed image in which a gray scale image is decomposed to components of different frequency bands;

a focal position probability calculator configured to, based on the resolution-decomposed images generated by the multiresolution transform image generator, calculate focal position probability distribution which is probability distribution regarding the focal positions, for each pixel position of the gray scale image;

an optimal focal position acquisition part configured to, based on the focal position probability distribution calculated by the focal position probability calculator, acquire an optimal focal position for each of the pixel positions; and an in-focus image synthesizer configured to, based on the optimal focal position acquired by the optimal focal position acquisition part, acquire, for each of the pixel positions, a pixel value corresponding to the optimal focal position from the image at each of the focal positions, and generate the in-focus image by providing a pixel corresponding to the acquired pixel value to the pixel position, provided that i and j are subscripts indicating the pixel position and $x_i$, $x_j$ are variables each of which is a natural number not larger than L, and $x_i$ is allocated to a plurality of pixel positions i as the focal positions, when a function, which is calculated by adding up a cost function $D_i(x_i)$ of each of the pixel positions i based on the focal position probability distribution calculated by the focal position probability calculator and a penalty function $V(x_i, x_j)$ which increases as an absolute value of a difference between $x_i$ and $x_j$ increases in regard to the pixel positions i and neighboring i and j, is an evaluation function E, the optimal focal position acquisition part approximately calculating a combination of $x_i$ in regard to the pixel positions i by belief propagation so that E is minimized, as the optical focal position.

9. The all-focused image generator according to claim 8, wherein, the focal position probability calculator includes:

a sampler configured to compare transform coefficients of resolution-decomposed images at different focal positions, which are generated by the multiresolution transform image generator, with each other for each pixel in the resolution-decomposed image, sample a predetermined number of transform coefficients from the compared transform coefficients serially from a transform coefficient having a largest absolute value in descending order, and sample the focal position of the resolution-decomposed image corresponding to each sampled transform coefficient; and a probability calculator configured to, in regard to a corresponding position which is a position of the resolution-decomposed image corresponding to the pixel position i and neighboring positions neighboring the corresponding position in each of a plurality of high-frequency components excluding a low-frequency component among the frequency components, add a weight corresponding to each transform coefficient sampled by the sampler as a probability value regarding the pixel position i of the focal position corresponding to that transform coefficient.

10. The all-focused image generator according to claim 8, wherein, the optimal focal position acquisition part includes:

a message calculator configured to calculate messages $m^t_{i \to j}$ represented by Numerical Expression 6 for all neighboring i and j and $x_j$ in the order of t=0, 1, 2, ..., and T, until t reaches T where the messages converge; and a focal position calculator configured to calculate the optimal focal position $x_i^*$ by Numerical Expression 7.

$$m^t_{i \to j}[x_j] = \min_{x_i} \left( V(x_i, x_j) + D_i(x_i) + \sum_{s \in Ne(i) \setminus j} m^{t-1}_{s \to i}[x_i] \right)$$ [Numerical Expression 6]

$$x_i^* = \min_{x_i} \left( D_i(x_i) + \sum_{j \in Ne(i)} m^T_{j \to i}[x_i] \right)$$ [Numerical Expression 7]

11. A non-transitory computer-readable recording medium recording thereon a computer program causing a computer to generate an in-focus image of an object from L object images taken at different focal positions, L indicating a natural number not smaller than two, the program causing the computer to execute the steps of:

(i) by performing multiresolution transform for gray scale images at the focal positions of the object, generating, for each of the focal positions, a resolution-decomposed image in which a gray scale image is decomposed to components of different frequency bands;

(ii) based on the resolution-decomposed image generated in the step (i), calculating focal position probability distribution which is probability distribution regarding the focal positions, for each pixel position of the gray scale image;

(iii) based on the focal position probability distribution calculated in the step (ii), acquiring an optimal focal position for each of the pixel positions; and (iv) based on the optimal focal position acquired in the step (iii), acquiring, for each of the pixel positions, a pixel value corresponding to the optimal focal position from the image taken at each of the focal positions, and generating the in-focus image by providing a pixel corresponding to the acquired pixel value to the pixel position, in the step (iii), provided that i and j are subscripts indicating the pixel position, $x_i$ and $x_j$ are variables each of which is a natural number not larger than L, and $x_i$ is allocated to a plurality of pixel positions i as the focal positions, when a function, which is calculated by adding up a cost function $D_i(x_i)$ of each of the pixel positions i based on the focal position probability distribution calculated in the step (ii) and a penalty function $V(x_i, x_j)$ which increases as an absolute value of a difference between $x_i$ and $x_j$ increases in regard to the pixel positions i and neighboring i and j, is an evaluation function E, a combination of $x_i$ in regard to the pixel positions i, with which E is minimized, being approximately calculated by belief propagation as the optimal focal position.

12. The non-transitory computer-readable recording medium according to claim 11, wherein, the step (ii) includes the sub-steps of:

(1) comparing transform coefficients of resolution-decomposed images at different focal positions, which are generated in the step (i), with each other for each pixel in the resolution-decomposed images, sampling a predetermined number of transform coefficients from the compared transform coefficients serially from a transform coefficient having a largest absolute value in descending order, and sampling the focal position of the resolution-decomposed image corresponding to each sampled transform coefficient; and (2) in regard to a corresponding position which is a position of the resolution-decomposed image corresponding to the pixel position i and neighboring positions neighboring the corresponding position in each of a plurality of high-frequency components excluding a low-frequency component among the frequency components, adding a weight corresponding to each transform coefficient sampled in the step (1) as a probability value regarding the pixel position i of the focal position corresponding to that transform coefficient.

13. The non-transitory computer-readable recording medium according to claim 11, wherein, the step (iii) includes the sub-steps of:

(3) calculating messages $m^t_{i \to j}$ represented by Numerical Expression 8 for all neighboring i and j and $x_j$ in the order of t=0, 1, 2, ..., and T, until t reaches T where the messages converge; and (4) calculating the optimal focal position $x_i^*$ by Numerical Expression 9.

$$m^t_{i \to j}[x_j] = \min_{x_i}\left(V(x_i, x_j) + D_i(x_i) + \sum_{s \in Ne(i)\setminus j} m^{t-1}_{s \to i}[x_i]\right) \quad \text{[Numerical Expression 8]}$$

$$x_i^* = \min_{x_i}\left(D_i(x_i) + \sum_{j \in Ne(i)} m^T_{j \to i}[x_i]\right) \quad \text{[Numerical Expression 9]}$$

14. An object height data acquisition method comprising the steps of:

(i) taking L images of an object at different focal positions, which images are associated with height information calculated from the focal positions, L indicating a natural number not smaller than two;

(ii) acquiring gray scale images of the object at the respective focal positions based on the images taken in the step (i);

(iii) by performing multiresolution transform for the gray scale images obtained in the step (ii), generating, for each of the focal positions, a resolution-decomposed image in which a gray scale image is decomposed to components of different frequency bands;

(iv) based on the resolution-decomposed image generated in the step (iii), calculating focal position probability distribution which is probability distribution regarding the focal positions, for each pixel position of the gray scale image;

(v) based on the focal position probability distribution calculated in the step (iv), acquiring an optimal focal position for each of the pixel positions; and (vi) based on the optimal focal position acquired in the step (v), acquiring, for each of the pixel positions, the height information calculated from the focal position, in the step (v), provided that i and j are subscripts indicating the pixel position and $x_i$ and $x_j$ are variables each of which is a natural number not larger than L and $x_i$ is allocated to a plurality of pixel positions i as the focal positions, when a function, which is calculated by adding up a cost function $D_i(x_i)$ of each of the pixel positions i based on the focal position probability distribution calculated in the step (iv) and a penalty function $V(x_i, x_j)$ which increases as an absolute value of a difference between $x_i$ and $x_j$ increases in regard to the pixel positions i and neighboring i and j, is an evaluation function E, a combination of $x_i$ in regard to the pixel positions i, with which E is minimized, being approximately calculated by belief propagation as the optimal focal position.

15. An object height information acquisition device for acquiring a position of an object based on L images of the object taken at different focal positions, which images are associated with height information calculated from the focal positions, L indicating a natural number not smaller than two, the device comprising:

a memory; and a processor coupled to the memory, the processor configured to execute instructions stored in the memory, the instructions comprising:

a multiresolution transform image generator configured to, by performing multiresolution transform for gray scale images at the respective focal positions of the object, generate, for each of the focal positions, a resolution-decomposed image in which a gray scale image is decomposed to components of different frequency bands;

a focal position probability calculator configured to, based on the resolution-decomposed image generated by the multiresolution transform image generator, calculate focal position probability distribution which is probability distribution regarding the focal positions, for each pixel position of the gray scale image;

an optimal focal position acquisition part configured to, based on the focal position probability distribution calculated by the focal position probability calculator, acquire an optimal focal position for each of the pixel positions; and a height information acquisition part configured to acquire the height information calculated from the optimal focal position for each of the pixel positions, based on the optimal focal position acquired by the optimal focal position acquisition part, provided that i and j are subscripts indicating the pixel position and $x_i$ and $x_j$ are variables each of which is a natural number not larger than L and $x_i$ is allocated to a plurality of pixel positions i as the focal positions, when a function, which is calculated by adding up a cost function $D_i(x_i)$ of each of the pixel positions i based on the focal position probability distribution calculated by the focal position probability calculator and a penalty function $V(x_i, x_j)$ which increases as an absolute value of a difference between $x_i$ and $x_j$ increases in regard to the pixel positions i and neighboring i and j, is an evaluation function E, the optimal focal position acquisition part approximately calculating a combination of $x_i$ in regard to the pixel positions i so that E is minimized, by belief propagation.

16. A non-transitory computer-readable recording medium recording thereon a computer program causing a computer to acquire height information of an object based on L images of the object taken at different focal positions, which images are associated with height information calculated from the focal positions, L indicating a natural number not smaller than two, the program causing the computer to execute the steps of:

(i) by performing multiresolution transform for gray scale images at the respective focal positions of the object, generating, for each of the focal positions, a resolution-decomposed image in which a gray scale image is decomposed to components of different frequency bands;

(ii) based on the resolution-decomposed image generated in the step (i), calculating focal position probability distribution which is probability distribution regarding the focal positions, for each pixel position of the gray scale image;

(iii) based on the focal position probability distribution calculated in the step (ii), acquiring an optimal focal position for each of the pixel positions; and (iv) acquiring the height information calculated from the optimal focal position for each of the pixel positions, based on the optimal focal position acquired in the step (iii), provided that i and j are subscripts indicating the pixel position and $x_i$ and $x_j$ are variables each of which is a natural number not larger than L and $x_i$ is allocated to a plurality of pixel positions i as the focal positions, when a function, which is calculated by adding up a cost function $D_i(x_i)$ of each of the pixel positions i based on the focal position probability distribution calculated in the step (ii) and a penalty function $V(x_i, x_j)$ which increases as an absolute value of a difference between $x_i$ and $x_j$ increases in regard to the pixel positions i and neighboring i and j, is an evaluation function E, the computer is caused to approximately calculate a combination of $x_i$ in regard to the pixel positions i so that E is minimized, by belief propagation.

* * * * *